US008321715B2

(12) United States Patent
Oku et al.

(10) Patent No.: US 8,321,715 B2
(45) Date of Patent: Nov. 27, 2012

(54) COMMUNICATION APPARATUS HAVING CLOCK INTERFACE

(75) Inventors: Tatsuya Oku, Kawasaki (JP); Masato Hashizume, Kawasaki (JP); Hiroshi Nishida, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 401 days.

(21) Appl. No.: 12/368,715

(22) Filed: Feb. 10, 2009

(65) Prior Publication Data

US 2009/0249107 A1 Oct. 1, 2009

(30) Foreign Application Priority Data

Mar. 25, 2008 (JP) ................................. 2008-078452

(51) Int. Cl.
*G06F 1/00* (2006.01)
(52) U.S. Cl. ........................................ 713/500; 370/509
(58) Field of Classification Search .......... 713/500–503, 713/600; 370/509, 535
See application file for complete search history.

(56) References Cited

U.S. PATENT DOCUMENTS

| 6,151,336 A * | 11/2000 | Cheng et al. .................. 370/535 |
| 6,446,146 B1 | 9/2002 | Yamaguchi et al. |
| 2008/0031393 A1 | 2/2008 | Tsurumi et al. |
| 2008/0086654 A1* | 4/2008 | Sogabe et al. ................ 713/501 |

FOREIGN PATENT DOCUMENTS

| JP | 63-261940 | 10/1988 |
| JP | 2000-069022 | 3/2000 |
| JP | 2004-064585 | 2/2004 |
| JP | 2008-42288 | 2/2008 |
| JP | 2009-232406 A * | 8/2009 |

OTHER PUBLICATIONS

Japanese Patent Office Notification of Reasons for Refusal mailed Sep. 18, 2012 for corresponding Japanese Patent Application No. 2008-078452.

* cited by examiner

*Primary Examiner* — Brian Misiura
*Assistant Examiner* — Kim Huynh
(74) *Attorney, Agent, or Firm* — Staas & Halsey LLP

(57) ABSTRACT

A communication apparatus having a clock interface unit supplying a clock signal for synchronization, includes a clock extracting section for extracting a clock component from a receive signal, a decoding section for generating a decoded signal by decoding in a predetermined encoding form the clock component extracted by the clock extracting section, a frame converting section for creating a receive frame by converting the decoded signal to a frame in a predetermined frame form, a determining section for determining whether the predetermined encoding form and the predetermined frame form are right or not on a basis of the receive frame, a setting section for performing setting regarding the clock signal on a basis of the encoding form and frame form determined to be right by the determining section, and a clock signal output section for outputting the clock signal generated on a basis of the setting by the setting section.

7 Claims, 17 Drawing Sheets

COMMUNICATION APPARATUS HAVING CLOCK INTERFACE

CROSS-REFERENCE TO RELATED APPLICATIONS

This application is based upon and claims the benefit of priority of the prior Japanese Patent Application No. 2008-078452, filed on Mar. 25, 2008, the entire contents of which are incorporated herein by reference.

FIELD

An embodiment discussed herein relates to a communication apparatus having a clock interface and a clock signal setting method.

BACKGROUND

Hitherto, a communication apparatus having an interface such as a SONET (Synchronous Optical NETwork)/SDH (Synchronous Digital Hierarchy) interface and an Ethernet (registered trademark) interface are highly standardized, and the commonality of hardware is relatively easy.

A technology has been known that, in a network channel terminating apparatus that terminates SONET/SDH lines with different line speed, processes data on the lines in accordance with clocks corresponding to the line speeds (refer to Japanese Laid-Open Patent Publication No. 2000-69022, for example). Thus, allowing the network channel terminating apparatus to support multiple line speeds can reduce the circuit size, the number of external terminals, the number of man-hours for the development of firmware and the firmware size.

However, clock supply devices and clock interfaces to be used for the synchronization in a SONET/SDH communication apparatus have different specifications among countries. Currently, there coexist standards such as GR standard (telcordia) in North America, ETSI standard in general countries and NTT (registered trademark) standard for communication within Japan, as follows.
(1) North America Specifications: DS1 Interface (speed: 1.544 Mbps, code: AMI/B8ZS and frame: SF/ESF)/1.544 Mbps frame provided by ITU-T G703.704
(2) ETSI Specifications: E1 Interface (speed: 2.048 Mbps, code: HDB3: singleFrame/MultiFrame)/either 2.048 Mbps frame or 2.048 MHz provided by ITU-T G703.704.
(3) NTT Specifications: CREC: 64 K+8 K ITU-T G703.704/ CSEND: 6.312 MHz (sin waves)

SUMMARY

According to an aspect of an embodiment, a communication apparatus having a clock interface unit supplying a clock signal for synchronization, the communication apparatus includes a clock extracting section for extracting a clock component from a receive signal, a decoding section for generating a decoded signal by decoding in a predetermined encoding form the clock component extracted by the clock extracting section, a frame converting section for creating a receive frame by converting the decoded signal to a frame in a predetermined frame form, a determining section for determining whether the predetermined encoding form and the predetermined frame form are right or not on a basis of the receive frame, a setting section for performing setting regarding the clock signal on a basis of the encoding form and frame form determined to be right by the determining section, and a clock signal output section for outputting the clock signal generated on a basis of the setting by the setting section.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

With reference to drawings, embodiments will be described below.

Figure 1:
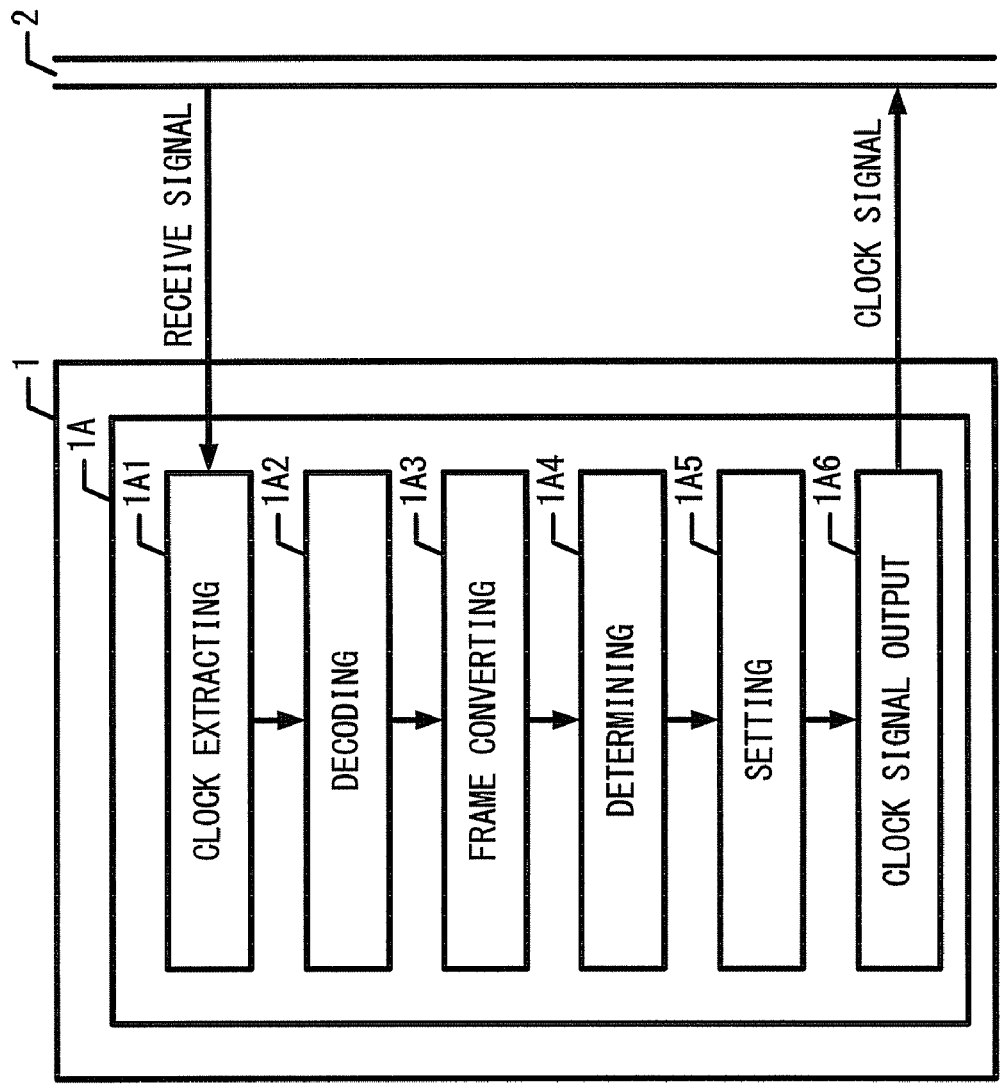
FIG. 1 is a diagram illustrating an outline of an embodiment.

FIG. 1 is a diagram illustrating an outline of an embodiment. A communication apparatus 1 illustrated in FIG. 1 performs communication in synchronization on the basis of a clock signal. The communication apparatus 1 connects to a network 2 employing a SONET/SDH line and has a clock interface unit 1A that supplies a clock signal. The clock interface unit 1A has clock extracting section 1A1, decoding section 1A2, frame converting section 1A3, determining section 1A4, setting section 1A5 and clock signal output section 1A6.

The clock extracting section 1A1 extracts a clock component from a receive signal, which is transmitted over the network 2 and is received by the communication apparatus 1.

On the basis of the clock extracted by the clock extracting section 1A1, the decoding section 1A2 generates a decoded signal by decoding a clock signal from the clock interface unit 1A in a predetermined encoding form.

The frame converting section 1A3 creates a receive frame by converting the decoded signal generated by the decoding section 1A2 to a frame in a predetermined frame form.

The determining section 1A4 determines whether the predetermined encoding form and predetermined frame form are right or not on the basis of the receive frame created by the frame converting section 1A3. In other words, the determining section 1A4 determines whether the received clock signal is encoded in a specific encoding form and the receive clock signal decoded on the basis of the encoding form has a specific frame form or not or whether one of the encoding form and the frame form is different or not.

The setting section 1A5 performs setting regarding the clock signal supplied by the clock interface unit 1A on the clock interface unit 1A that supplies a clock signal on the basis of the predetermined encoding form and frame form if the determining section 1A4 determines that the predetermined encoding form and predetermined frame form are right.

The clock signal output section 1A6 generates the clock signal on the basis of the setting by the setting section 1A5 and outputs the generated clock signal to the outside through the communication apparatus 1 and over the network 2.

Having described that the clock interface unit 1A in the communication apparatus 1 includes the clock extracting section 1A1, decoding section 1A2, frame converting section 1A3, determining section 1A4, setting section 1A5 and clock signal output section 1A6, the present embodiment is not limited thereto. The communication apparatus 1 may include all or a part of the section separately from the clock interface unit 1A.

In the communication apparatus 1, a clock component is extracted from a receive signal by the clock extracting section 1A1, and the clock component is decoded to generate the decoded signal by the decoding section 1A2. The decoded signal is converted to a frame to create the receive frame by the frame converting section 1A3. Whether the encoding form and frame form are right or not is determined by the determining section 1A4. If it is determined by the determining section 1A4 that the encoding form and frame form are right, setting regarding the clock signal is performed on the clock signal output section 1A6 by the setting section 1A5. The clock signal based on the setting is output by the clock signal output section 1A6.

Thus, the encoding form and frame form of the receive signal are determined on the basis of the clock component extracted from the receive signal, and the clock signal is set on the basis of the determination result. Therefore, the standards for multiple clock signals having different specifications can be supported.

With reference to drawings, the embodiment will be described in detail below.

Figure 2:
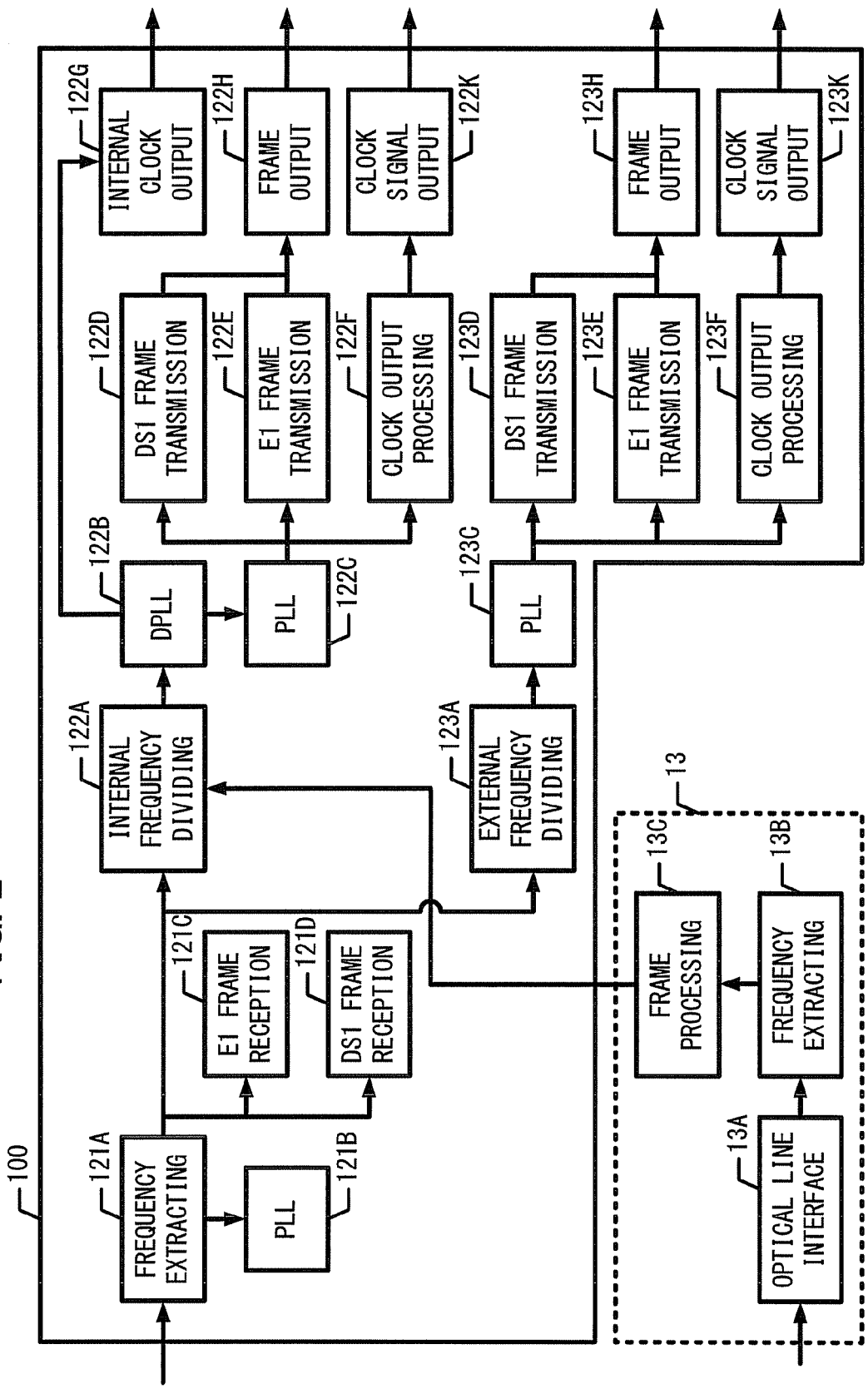
FIG. 2 is a diagram illustrating a configuration of a clock interface unit.

FIG. 2 is a diagram illustrating a configuration of a clock interface unit. A clock interface unit 100 illustrated in FIG. 2 determines an applied clock signal on the basis of the encoding form and frame form of the signal on a SONET/SDH line, which is input at an interface receiving unit, not shown, in a communication apparatus 10 (refer to FIG. 3) and sets a clock signal automatically on the basis of the determination result.

The clock interface unit 100 includes a frequency extracting section 121A, an M/N phase locked loop section 121B, an E1 frame reception processing section 121C, a DS1 frame reception processing section 121D, an internal frequency dividing section 122A, a DPLL section 122B, an M/N phase PLL section 122C, a DS1 frame transmission processing section 122D, an E1 frame transmission processing section 122E, a clock output processing section 122F, an internal clock output section 122G, a frame output section 122H, a clock signal output section 122K, an external frequency dividing section 123A, an M/N phase PLL section 123C, a DS1 frame transmission processing section 123D, an E1 frame transmission processing section 123E, a clock output processing section 123F, a frame output section 123H and a clock signal output section 123K.

The clock interface unit 100 of this embodiment connects to an optical line terminal unit 13 that supplies a line input to the clock interface unit 100. The optical line terminal unit 13 includes an optical network interface section 13A connecting to an optical network, not shown, a frequency extracting section 13B that extracts a clock from an optical signal transmitted from the optical network and a frame processing section 13C that configures a frame from the optical signal.

The frequency extracting section 121A extracts a clock component from a signal received by an interface receiving section.

The M/N phase locked loop section 121B is a phase locked loop using M, N divided clock signals. The M/N phase locked loop section 121B generates a clock signal at a clock rate under the corresponding standard.

The E1 frame reception processing section 121C performs processing of configuring an E1 frame from the clock component extracted by the frequency extracting section 121A.

The DS1 frame reception processing section 121D performs processing of configuring a DS1 from the clock component extracted by the frequency extracting section 121A.

The internal frequency dividing section 122A selects one of the signal having the clock component extracted by the frequency extracting section 121A and the signal input from the optical network terminal unit 13, divides the frequency of the signal and performs control according to the clock rate of the clock signal under the corresponding standard.

The external frequency dividing section 123A divides the frequency of the clock component extracted by the frequency extracting section 121A and controls the result in accordance with the clock rate of the clock signal under the corresponding standard.

The DPLL (Digital Phase Locked Loop) section 122B is a digital phase locked loop that performs digital filtering on a signal divided by the external frequency dividing section 122A. The DPLL section 122B is defined to adapt to the one under the strictest requirements among the standards.

The M/N phase PLL section 122C synchronizes frequencies and phases on the basis of a clock signal output from the DPLL section 122B to generate a clock signal having a clock rate under the corresponding standard.

The M/N phase PLL section 123C synchronizes frequencies and phases on the basis of a clock signal output from the external frequency dividing section 123A to generate a clock signal having a clock rate under the corresponding standard.

The DS1 frame transmission processing section 122D creates a DS1 frame on the basis of the clock signal generated by the M/N phase PLL section 122C. The DS1 frame transmission processing section 123D creates a DS1 frame on the basis of the clock signal generated by the M/N phase PLL section 123C.

The E1 frame transmission processing section 122E creates an E1 frame on the basis of the clock signal generated by the M/N phase PLL section 122C. The E1 frame transmission processing section 122E creates an E1 frame on the basis of the clock signal generated by the M/N phase PLL section 123C.

The clock output processing section 122F generates a clock signal at 6.312 MHz on the basis of the clock signal generated by the M/N phase PLL section 122C.

The clock output processing section 123F generates a clock signal at 6.312 MHz on the basis of the clock signal generated by the M/N phase PLL section 123C.

The internal clock output section 122G outputs an internal clock to be used for synchronization control within the transmitting apparatus 10 on the basis of the clock signal output from the DPLL section 122B.

The frame output section 122H outputs the DS1 frame generated by the DS1 frame transmission processing section 122D and the E1 frame generated by the E1 frame transmission processing section 122E.

The frame output section 123H outputs the DS1 frame generated by the DS1 frame transmission processing section 123D and the E1 frame generated by the E1 frame transmission processing section 123E.

The clock signal output section 122K outputs a clock signal at 6.312 MHz generated by the clock output processing section 122F.

The clock signal output section 123K outputs a clock signal at 6.312 MHz generated by the clock output processing section 123F.

Next, the functions of the clock interface unit 100 will be described.

Figure 3:
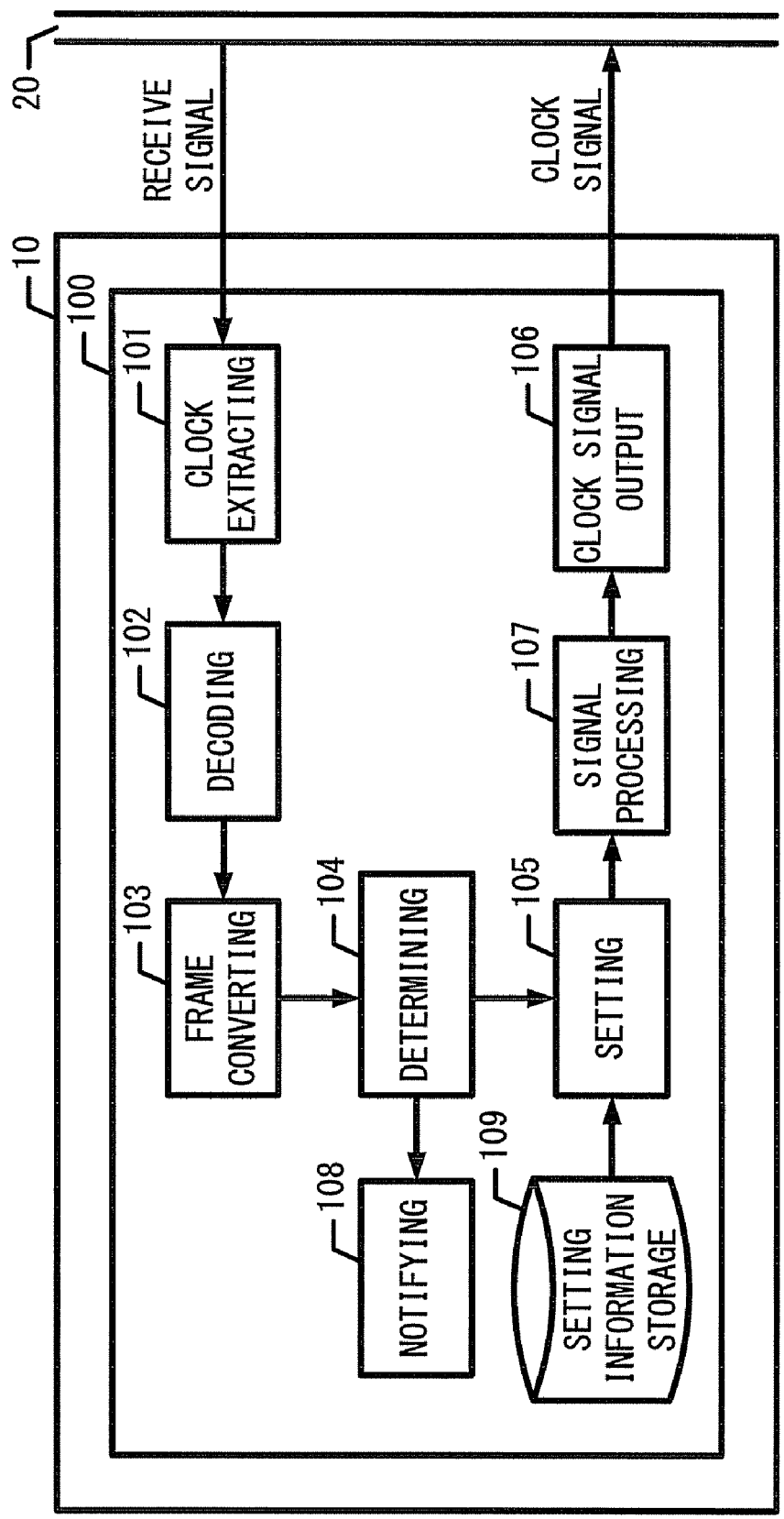
FIG. 3 is a block diagram illustrating functions of the clock interface unit.

FIG. 3 is a block diagram illustrating functions of the clock interface. The communication apparatus 10 illustrated in FIG. 3 is an apparatus that performs communication on the basis of SONET/SDH standard in synchronization with a clock signal. The communication apparatus 10 connects to a SONET/SDH line 20. The communication apparatus 10 has a clock interface unit 100 that supplies a clock signal. The clock interface unit 100 includes a clock extracting section 101, a decoding section 102, a frame converting section 103, a determining section 104, a setting section 105 and a clock signal output section 106.

If the clock extracting section 101 receives the input of a receive signal, which is transmitted over the SONET/SDH line 20 connecting to the communication apparatus 10 and is received by the communication apparatus 10, the clock extracting section 101 extracts a clock component from the receive signal.

The clock extracting section 101 further extracts a frequency component contained in the receive signal. If a sin wave (or sine curve) at a frequency of 64 kHz is detected from the extracted frequency component, the clock extracting section 101 determines that it is a 64 kHz clock signal under the NTT standard. The determination can be based on the frequency component of the receive signal without through the decoding section 102 because the 64 kHz clock signal under the NTT standard is a sin wave at a frequency of 64 kHz and is not a TTL signal to be used in binary codes.

The decoding section 102 decodes the clock component extracted by the clock extracting section 101 in a predetermined encoding form to generate the decoded signal. In other words, the decoding section 102 decodes the clock signal input to the clock interface unit 100 in a predetermined encoding form on the basis of the clock signal extracted by the clock extracting section 101 to generate the decoded signal.

Here, the encoding form is a binary encoding form to be used under DS1 and E1 standards in the SONET/SDH line 20 for transmitting control signals including a clock signal and data signals. The encoding form to be used in the SONET/SDH line 20 may include AMI, B8ZS (for DS1) and/or HDB3 (for E1), for example, the details of which will be described with reference to FIG. 4. The predetermined encoding form is an encoding form applicable for the exchange of a clock signal in the communication apparatus 10.

If multiple predetermined encoding forms exist, the decoding section 102 decodes the clock component extracted by the clock extracting section 101 in all of the predetermined encoding forms to generate the decoded signals.

The frame converting section 103 converts the decoded signal generated by the decoding section 102 to a frame in a predetermined frame form to generate the receive frame.

Here, the frame form is a frame form to be used under a standard of the SONET/SDH line 20 for transmitting control signals including a clock signal and data signals. The frame form to be used in the SONET/SDH line 20 may be DS1 (SF) and/or DS1 (EST) (for DS1) and/or E1 (Single) and/or E1 (Multi) (for E1), for example, the details of which will be described with reference to FIG. 4. The predetermined frame form is a frame form applicable for the exchange of a clock signal in the communication apparatus 10.

If multiple predetermined frame forms exist, the frame converting section 103 converts the decoded signal generated by the decoding section 102 into frames in all of the predetermined frame forms to generate the decoded signals.

The determining section 104 determines whether the predetermined encoding form and the predetermined frame form are right or not on the basis of the receive frame generated by the frame converting section 103. In other words, the determining portion 104 determines whether the received clock signal, which is encoded in a specific encoding form and is decoded in the encoding form, is in a specific frame form or one of the encoding form and the frame form is different or not.

More specifically, the determining portion 104 attempts the establishment of the synchronization with the receive frame generated by the frame converting section 103 and determines that the encoding form and frame form are right if the synchronization is established.

If at least either multiple predetermined encoding forms or multiple predetermined frame forms exist, the determining section 104 determines whether the combination of the encoding form and frame form of the receive frame converted by the frame converting section 103 is right or not and determines the right combination of the encoding form and frame form on the basis of the determination result. Without limiting thereto, meaningless combinations for the determination may be excluded from the subjects of the determination, such as a combination which is not used in reality and a combination which is clearly not used in the environment of a user.

If the determining section 104 determines that the predetermined encoding form and predetermined frame form are right, the setting section 105 performs setting regarding clock signals supplied from the clock interface unit 100 on the clock interface unit 100 that receives the supply of the clock signals on the basis of the encoding form and frame form, which are determined as right.

The setting section 105 performs setting regarding clock signals supplied from the clock interface unit 100 on the basis of the determined right combination of the encoding form and the frame form. In this case, the setting section 105 performs the setting regarding clock signals by loading setting information according to the encoding form and frame form, which are determined as right by the determining section 104, from a setting information storage section 109 and writing the loaded setting information to a signal processing section 107 in the clock interface unit 100.

Under the control of the signal processing section 107 based on the setting by the setting section 105, the clock signal output section 106 generates a clock signal and outputs the generated clock signal to the outside through the inside of the communication apparatus 10 and over the SONET/SDH line 20.

The signal processing section 107 operates in accordance with firmware that controls the clock signal output section 106 to generate a clock signal on the basis of the encoding form and frame form, which are determined as right by the determining section 104, and output the generated clock signal. The firmware is rewritable in the signal processing section 107, and upon powering on the communication apparatus 10 or upon determination on the encoding form and frame form, the firmware is loaded from the setting information storage section 109 and is written in the signal processing section 107.

In a case where the clock interface unit 100 is set in one encoding form and one frame form of predetermined encoding forms and predetermined frame forms, if the determining section 104 determines the set encoding form and frame form as wrong on the basis of the receive frame generated by the frame converting section 103, a notifying section 108 notifies that the encoding form and frame form are determined wrong to a user on a display apparatus connecting thereto, not shown, or other apparatus over a communication line, not shown.

Figure 10:
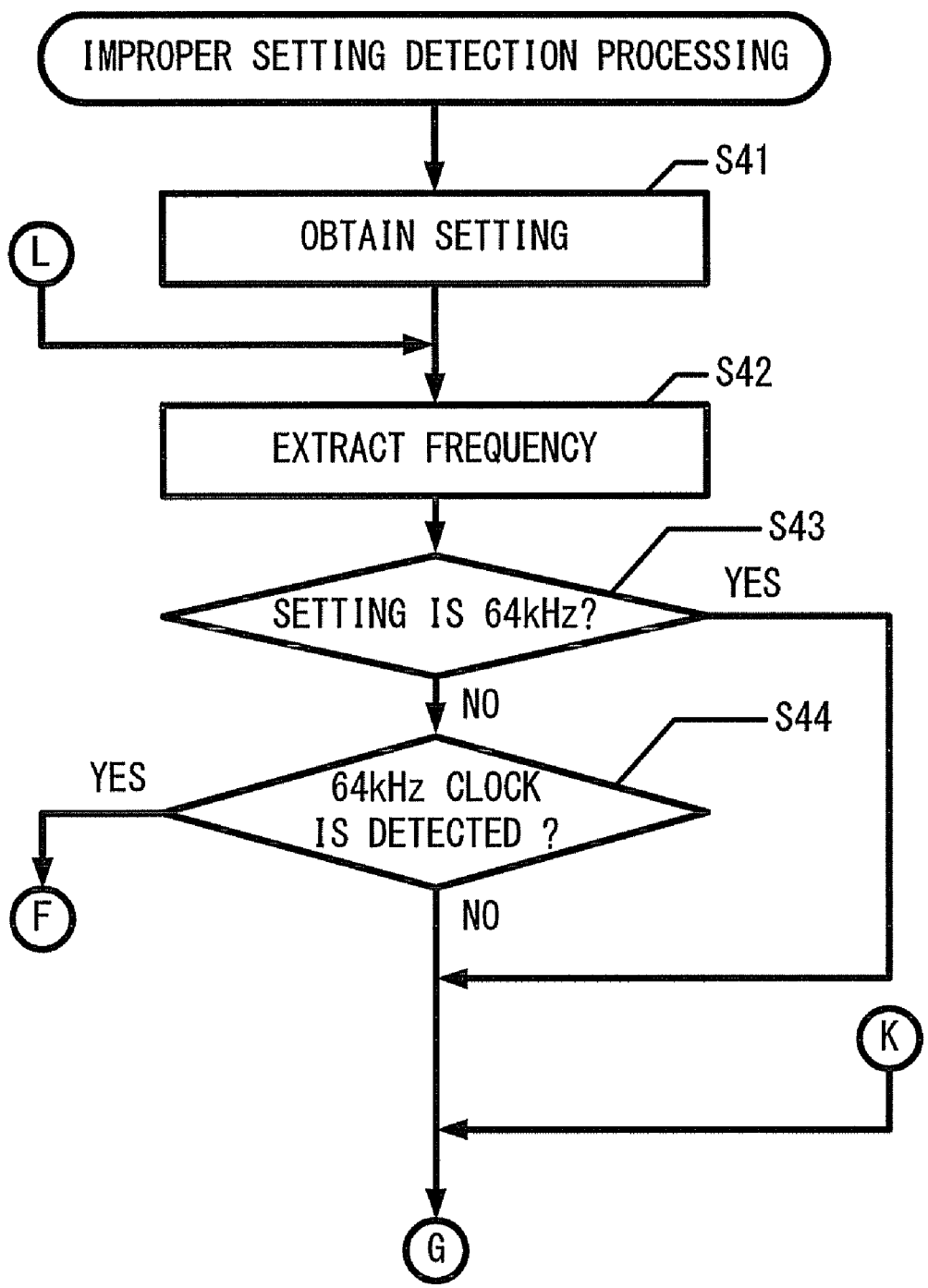
FIG. 10 is a flowchart illustrating steps of improper setting detection processing.
Figure 11:
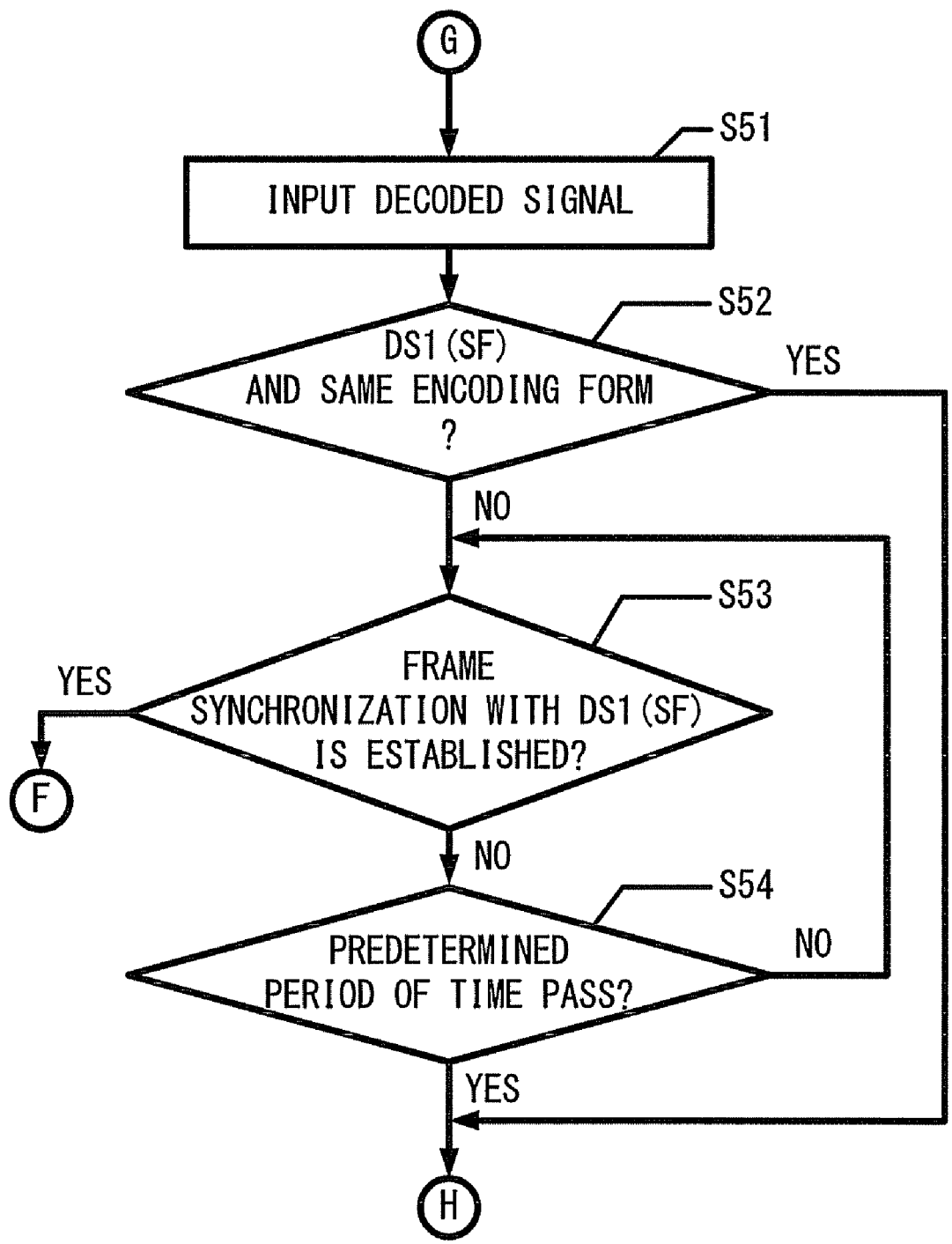
FIG. 11 is a flowchart illustrating steps of the improper setting detection processing.

Thus, as will be described later in detail with reference to FIG. 10, a user may predetermine the encoding form and frame form to be used in the clock interface unit 100 in the communication apparatus 10 in accordance with the encoding form and frame form used in the SONET/SDH line 20 connecting the communication apparatus 10. If the clock interface unit 100 is set with the encoding form and frame form determined by the user but the set encoding form and frame form are wrong and the synchronization on clock signals is not established with the connecting SONET/SDH line 20, the fact can be notified to a user or other apparatus.

The setting information storage section 109 stores the setting information that sets a clock signal supplied by the clock interface unit 100. The setting information includes program data of multiple firmware configurations operating in the signal processing section 107, which support the encoding forms and frame forms.

Thus, by using the program data of the firmware including setting information to rewrite the firmware in the signal processing section 107 in accordance with the encoding form and frame form of the clock signal to be used in the SONET/SDH line 20, the signal processing section 107 can be caused to perform proper processing in accordance with the clock signals supplied by the clock interface unit 100.

Figure 4:
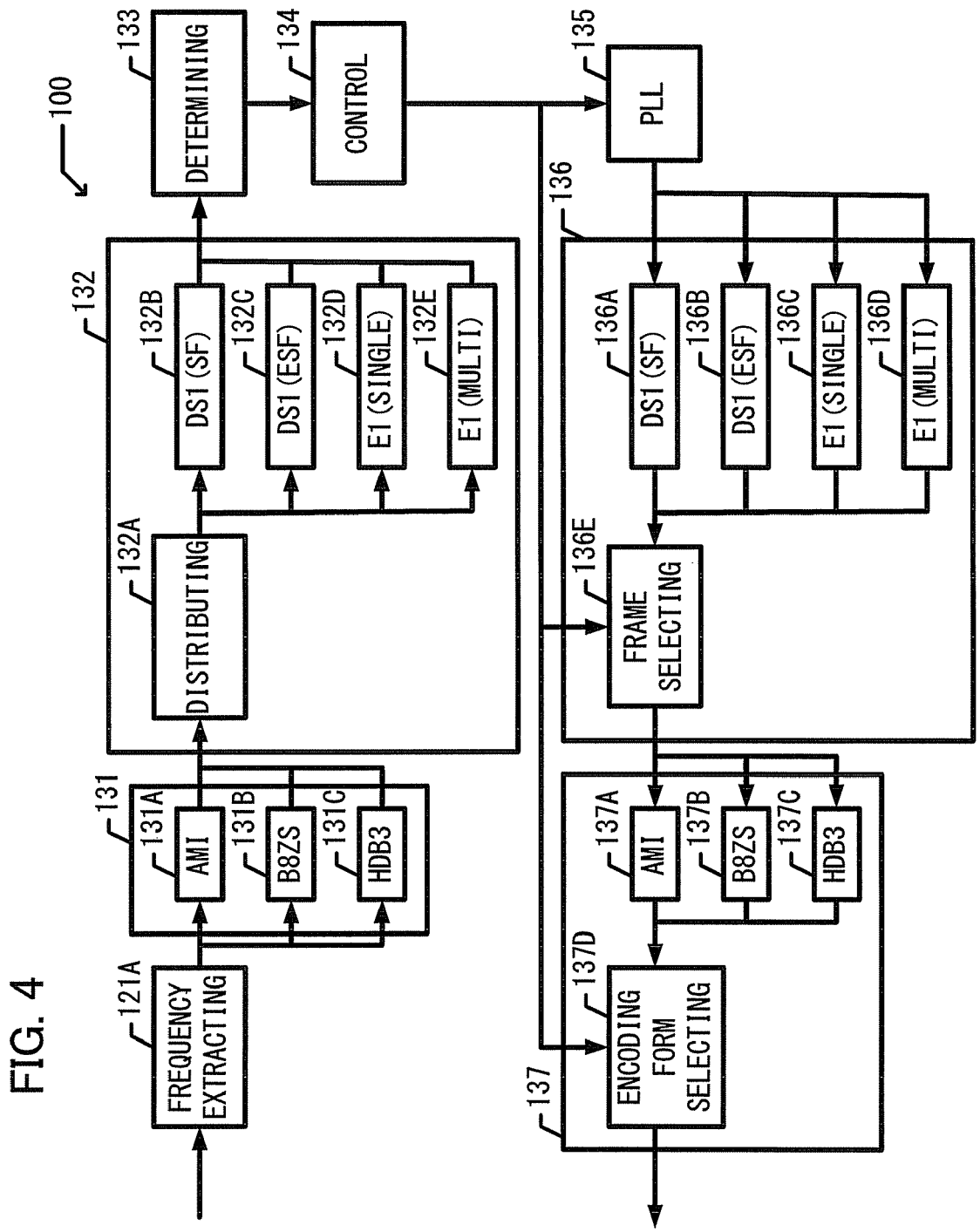
FIG. 4 is a diagram illustrating operations by the clock interface unit.

FIG. 4 is a diagram illustrating operations by the clock interface unit.

In the clock interface unit 100, the encoding form and frame form of an input signal can be determined automatically on the basis of the operations by a frequency extracting section 121A, a decoding section 131, a receive frame converting section 132, a determining section 133, a control section 134, an M/N phase locked loop section 135, a transmit frame converting section 136 and encoding section 137, which are illustrated in FIG. 4.

The frequency extracting section 121A extracts a clock component from a signal received by the communication apparatus 10 and input to the clock interface unit 100 and outputs the extracted clock signal.

The decoding section 131 decodes the clock signal output from the frequency extracting section 121A. Here, the decoding section 131 can decode a clock signal on the basis of three encoding forms by detecting signals under encoding rules of AMI 131A, B8ZS 131B and HDB3 131C.

The receive frame converting section 132 detects BPV (or BiPolar Violation) and detects the consecutiveness of the positive/negative polarities therein and further performs B8ZS-BPV detection. Decoded signals are input to the receive frame converting section 132 sequentially from encoding forms (131A-C) at predetermined period of times.

If a wrong decoded signal is input to the receive frame converting section 132, the determining section 133 determines that the synchronization is not established. The determining section 133 holds the encoding form (which is one of AMI, B8ZS and HDB3) when the establishment of the synchronization is determined. After that, the communication apparatus 10 operates on the basis of the encoding form.

The code in B8ZS/HDB3 and the code in AMI may be determined improperly due to the agreement therebetween in some content of data. In this case, the determining section 133 can perform the determination with reference to a threshold value of the BPV error detected by the receive frame converting section 132.

The receive frame converting section 132 performs frame conversion in the three encoding forms on the receive signal decoded by the decoding section 131. The receive frame converting section 132 includes a distributing section 132A that distributes the signals decoded in the three encoding forms by the decoding section 131 and converts the signals distributed by the distributing section 132A into frames in four frame forms of DS1 (SF: Super Frame) 132B, DS1 (ESF: Extended Super Frame) 132C, E1 (Single) 132D, and E1 (Multi) 132E.

Here, even if the synchronization is established in one of the encoding forms, the receive frame converting section 132 continuously performs the operations of the processing of the frame conversion on the signals encoded by other encoding forms and processing of determination and determines whether the synchronization in the other encoding forms is established or not. Without limiting thereto, if the synchronization is established in one of the encoding forms, the processing of frame conversion and processing of determination may end. If the synchronization is established once in a network configuration without the switching between DS1 and E1 in the middle, the other frame conversion processing may be suspended until the unsynchronization for a predetermined period of time or longer.

If the encoding form and frame from are known in advance, a user may instruct the control section 134 manually to set the encoding form and frame form for clock signals communicated by the communication apparatus 10.

The determining section 133 recognizes whether the synchronization has been established or not with the signals frame-converted on the basis of the four standards by the receive frame converting section 132. The determining section 133 determines that the frame under the standard that the synchronization has been established is the frame form of the receive signal.

On the basis of the result of the determination by the determining section 133, the control section 134 controls the M/N phase locked loop section 135, a frame selecting section 136E of the transmit frame converting section 136 and an encoding form selecting section 137D of the encoding section 137 to output the output signal from the encoding section 137 as a frame under the determined standard.

The control section 134 can set the frame form of output signals in accordance with the setting by a user irrespective of the result of the determination by the determining section 133 or without performing the determination by the determining section 133. Thus, the encoding form and frame form of clock signals can be preset if the encoding form and frame form of signals used in the transmitting apparatus 10 are identified.

The M/N phase locked loop section 135 determines the frequency to be synchronized under the control of the control section 134. Thus, the frequency of the clock signal output from the communication apparatus 10 is set. In this case, the M/N phase locked loop section 135 generates a clock signal at 1.544 MHz if the output signal is a DS1 frame in the details of the control by the control section 134. On the other hand, the M/N phase locked loop section 135 generates a clock signal at 2.048 MHz if the output signal is an E1 frame.

The transmit frame converting section 136 selects a frame in the frame form to be transmitted from the communication apparatus 10 under the control of the control section 134. Here, the transmit frame converting section 136 can perform frame conversion in four forms of DS1 (SF) 136A, DS1 (ESF) 136B, E1 (Single) 136C and E1 (Multi) 136D. The frame selecting section 136E selects a frame in one of the four forms on the basis of the control of the control section 134. The transmit frame converting section 136 performs the conversion into a frame in the form selected by the frame selecting section 136E for the data to be output.

The encoding section 137 encodes and outputs a frame of the type selected by the transmit frame converting section 136 under the control of the control section 134. Here, the encoding section 137 can encode in three encoding forms of AMI 137A, B8ZS 137B and HDB3 137C. An encoding form selecting section 137D selects one of the encoding forms on the basis of the control of the control section 134. On the basis of it, the clock interface unit 100 output a clock signal of the selected encoding form.

Next, the determination of the frame form in the clock interface unit 100 according to this embodiment will be described.

Figure 5:
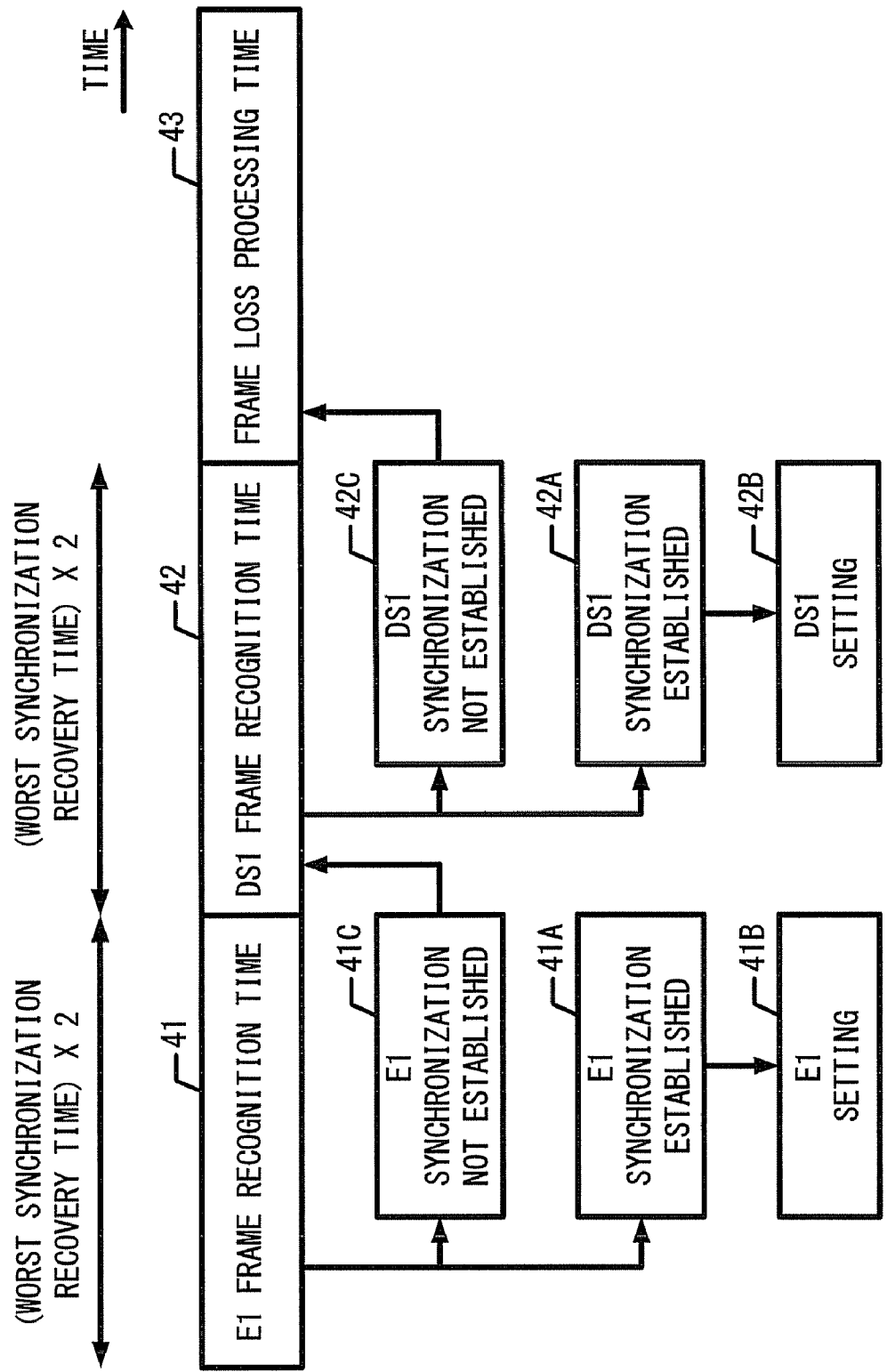
FIG. 5 is a diagram illustrating determination on a clock signal of a receive signal in the clock interface unit.

FIG. 5 is a diagram illustrating the determination of a clock signal of a receive signal in the clock interface unit.

In the clock interface unit 100 of this embodiment, frame synchronization processing is performed for each frame form. If the synchronization is established, communication is performed in the encoding form and frame form of the established frame. In FIG. 5, for convenience of explanation, a case will be described where the establishment of the synchronization with a certain encoding form is attempted once for each of E1 (Single) and DS1 (SF) and unsynchronization is determined if the synchronization is not established for both of them.

As shown in FIG. 5, in the clock interface unit 100, a frame recognition time to be secured for recognizing the encoding form and frame form of a frame is set, and the establishment of the synchronization of a frame is attempted in the frame recognition time. The frame recognition time includes an E1 frame recognition time 41 when the establishment of the synchronization of an E1 frame is repetitively attempted and a DS1 frame recognition time 42 when the establishment of the synchronization of a DS1 frame is repetitively attempted.

In the E1 frame recognition time 41, the establishment of the synchronization of an E1 frame is repetitively attempted with a lapse of a time t. If the attempt results in E1 synchronization-established 41A indicating that the synchronization for the E1 frame has been established, E1 settings 41B are adopted in which the settings are changed to support the E1 frame. On the other hand, if the synchronization for the E1 frame has not been established even after a lapse of the E1 frame recognition time 41, the E1 frame recognition time 41 ends. The attempt results in E1 synchronization-not-established 41C, and the DS1 frame recognition time 42 is started in which the synchronization for a DS1 frame is established.

In the DS1 frame recognition time 42, the establishment of the synchronization of a DS1 frame is repetitively attempted with a lapse of a time t. If the attempt results in DS1 synchronization-established 42A indicating that the synchronization for the DS1 frame has been established, DS1 settings 42B are adopted in which the settings are changed to support the DS1 frame. On the other hand, if the synchronization for the DS1 frame has not been established even after a lapse of the DS1 frame recognition time 42, the DS1 frame recognition time 42 ends. The attempt results in DS1 synchronization-not-established 42C, and a frame loss processing time 43 is started in which the processing is performed in a case where the synchronization for frames are not established.

For example, in a case where the time required for processing one frame is 125 μs, the number of sections of forward alignment (sync-out) guard time (such as five sections) and the number of sections of backward alignment (sync-in) guard time (such as five sections) for frames are set as times for performing the establishment of the synchronization of a frame. Then, the times required for the processing are secured as the frame recognition intervals. Even if the time twice as long as the synchronization recovery time passes at worst, the frame to be recognized is switched if the synchronization for the frame is not established. The E1 frame recognition is switched to the DS1 frame recognition.

In the determination on a clock signal of a receive signal, the number of sections of frame forward alignment guard time and the number of sections of frame backward alignment guard time can be set freely. The frame recognition time may also be set freely and may be set twice as long as the worst synchronization recovery time for each frame, for example. The sequence of the E1 frame recognition and the DS1 frame recognition can be altered. The frame recognition time may be set differently for each frame form. The encoding form and frame form can be selected freely. The number of times of attempt of the establishment of synchronization can be set freely.

Next, the setting for a clock LSI 150 in the clock interface unit 100 of this embodiment will be described.

Figure 6:
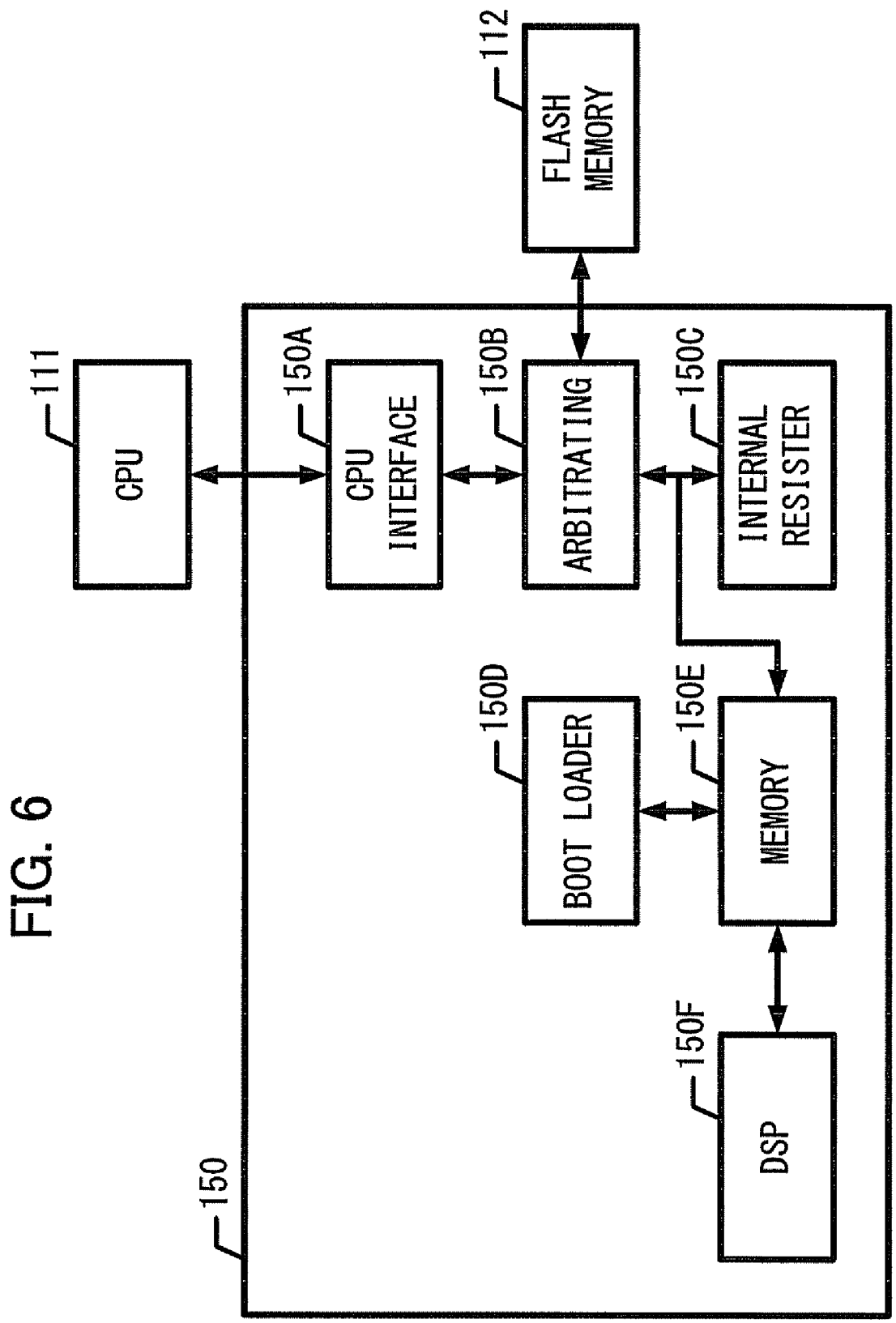
FIG. 6 is a diagram illustrating a configuration of a clock LSI.

FIG. 6 is a diagram illustrating a configuration of a clock LSI.

The clock LSI (Large Scale Integration) 150 illustrated in FIG. 6 is an LSI that controls the clock interface unit 100 under the control of a CPU (Central Processing Unit) 111. The clock LSI 150 includes a CPU interface section 150A, an arbitrating section 150B, an internal register group 150C, a boot loader section 150D, a memory section 150E and a DSP (Digital Signal Processor) 150F. The clock LSI 150 connects to a flash memory 112.

The CPU 111 is a processing device that controls the entire communication apparatus 10 in addition to the clock interface unit 100.

The CPU interface section 150A is an interface that connects to the CPU 111 for exchanging data and control signals.

In the clock LSI 150, the arbitrating section 150B arbitrates data communication in the flash memory 112 and other components within the clock LSI 150.

The internal register group 150C is a storage device that stores data to be used for processing within the clock LSI 150.

The boot loader section 150D is a program that is loaded upon start of the communication apparatus 10 and upon determination on a clock signal (refer to FIGS. 7 to 9) on a line connecting to the communication apparatus 10 to start the communication apparatus 10.

The memory section 150E stores a program to be executed in the clock interface unit 100 and data required for execution of the program.

The DSP 150F is a processor that performs digital signal processing. The DSP 150F processes a signal in accordance with the encoding form and frame form of the frame. In this case, by requiring the firmware that performs processing, the DSP 150F can be adapted to the encoding form and frame form of the clock signal to be processed.

The flash memory 112 is a rewritable non-volatile memory. The flash memory 112 stores a program of the firmware of the DSP 150F. The program data of the firmware is loaded to the DSP 150F to perform the processing corresponding the encoding form and frame form in the DSP 150F.

In the clock LSI 150 of this embodiment, if the encoding form and frame form of the frame of a receive signal are determined (or the encoding form and frame form of the frame to be communicated are defined by a user) upon start of the communication apparatus 10 and after the start of the communication apparatus 10, the boot loader section 150D loads the program data of the firmware corresponding to the determined encoding form and frame form of the frame. The boot loader section 150D writes and expands the program data of the loaded firmware in the DSP 150F. Thus, the DSP 150F is defined in accordance with the encoding form and frame form of the clock signals.

In this case, upon start of the communication apparatus 10, the boot loader section 150D also writes the firmware written in the DSP 150 at the previous time.

Here, the main differences between DS1 and E1 in the clock interface unit 100 includes differences in encoding forms (DS1: AMI/B8ZS and E1: HDB3) in the decoding secretion 131 (refer to FIG. 4), frame forms (DS1: SF/ESF and E1: Single/Multi) in the receive frame converting section 132 and transmit frame converting section 136, frequencies of clock signals (DS1: 1.544 MHz and E1: 2.048 MHz), time settings (such as setup times and hold times) and SSM (Sync Status Message) codes.

On the basis of the firmware written in the DSP 150F, which corresponds to the standard that differs as described above, the clock signal based on the standard can be determined, and the clock interface unit 100 and communication apparatus 10 are implemented that define on the basis of the determination result.

Next, routines of processing in the clock interface unit 100 of this embodiment will be described.

First of all, clock signal determination processing will be described in which the encoding form and frame form of a receive signal is determined in the clock interface unit 100 of this embodiment.

Figure 7:
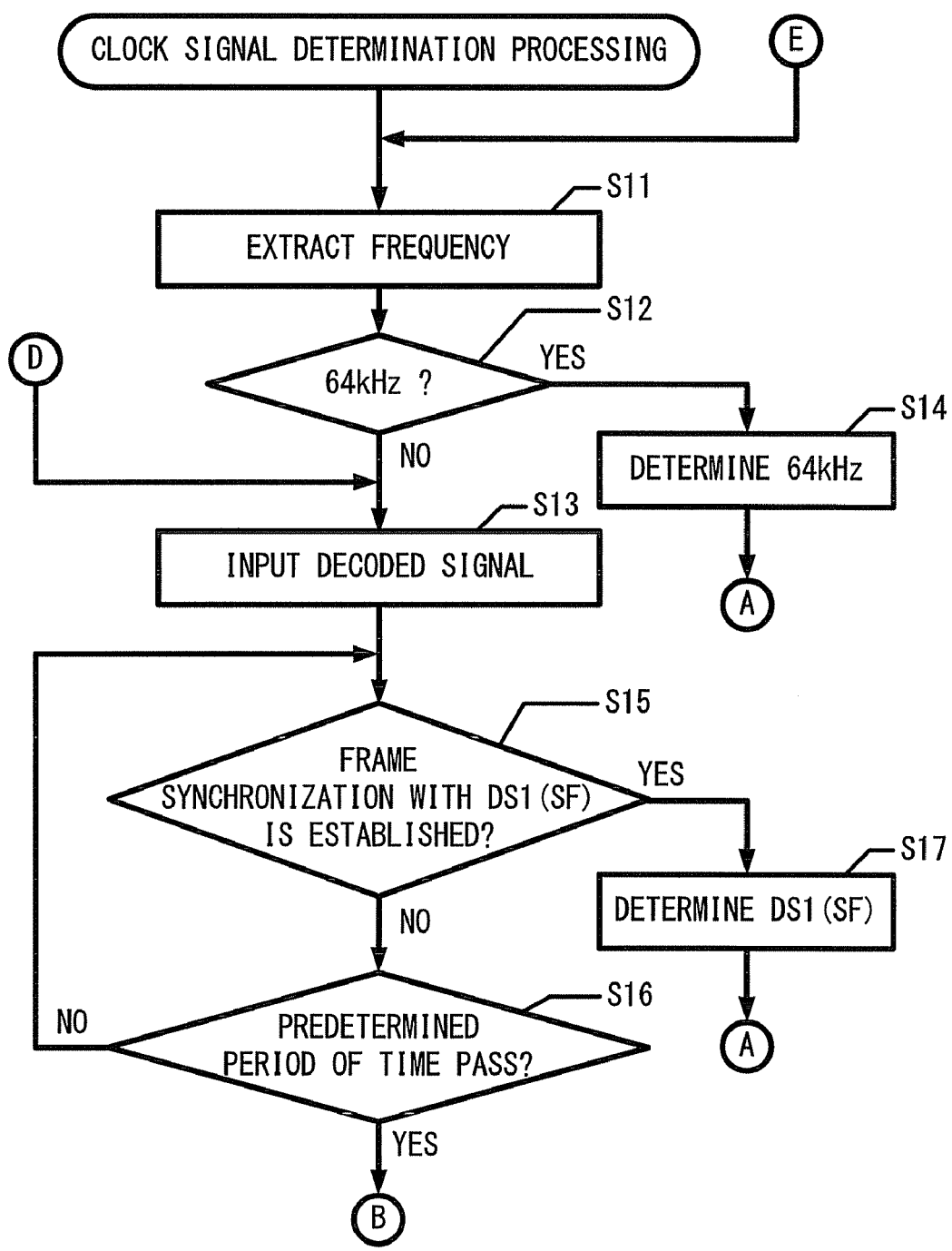
FIG. 7 is a flowchart illustrating steps of clock signal determination processing.
Figure 8:
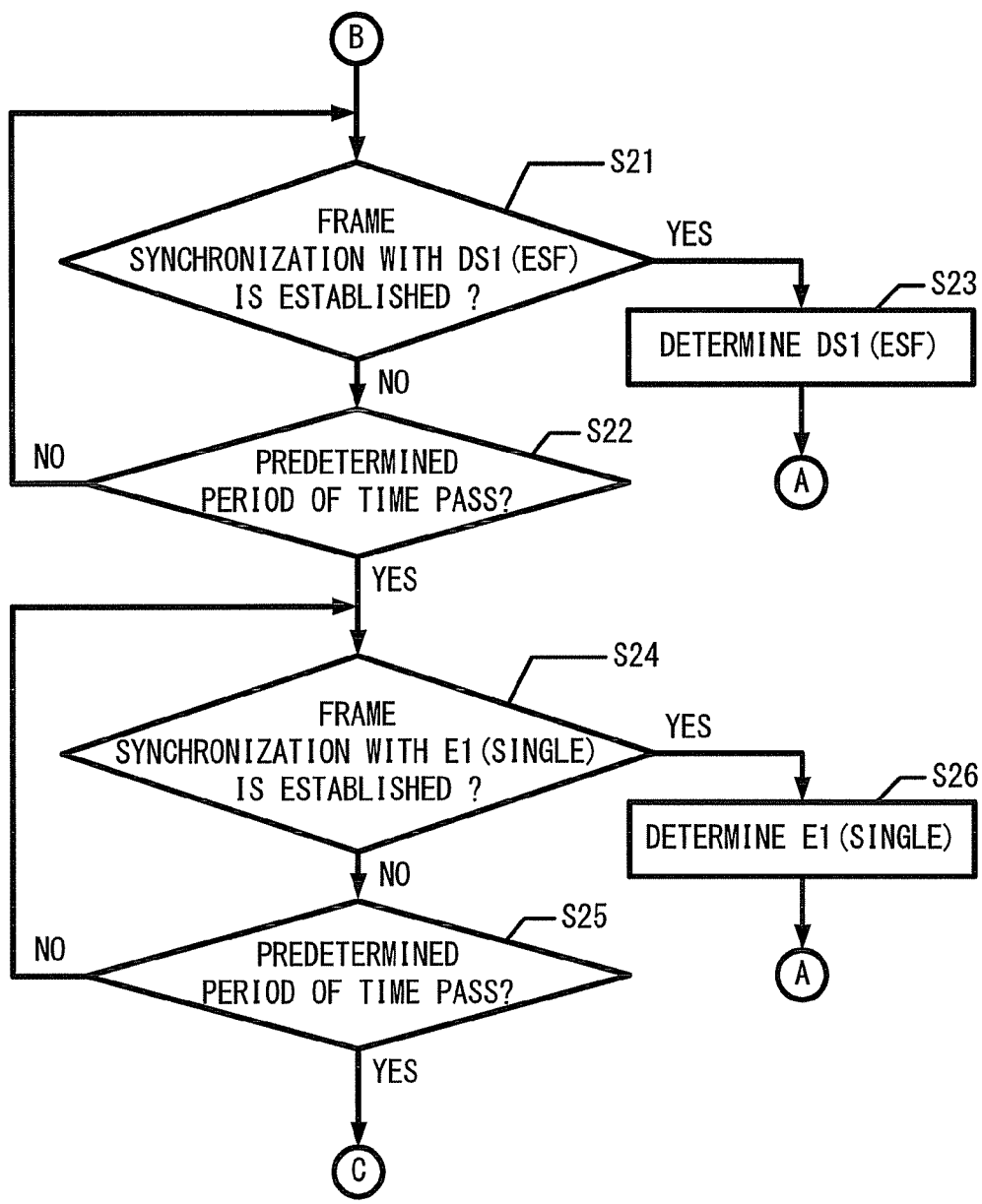
FIG. 8 is a flowchart illustrating steps of the clock signal determination processing.
Figure 9:
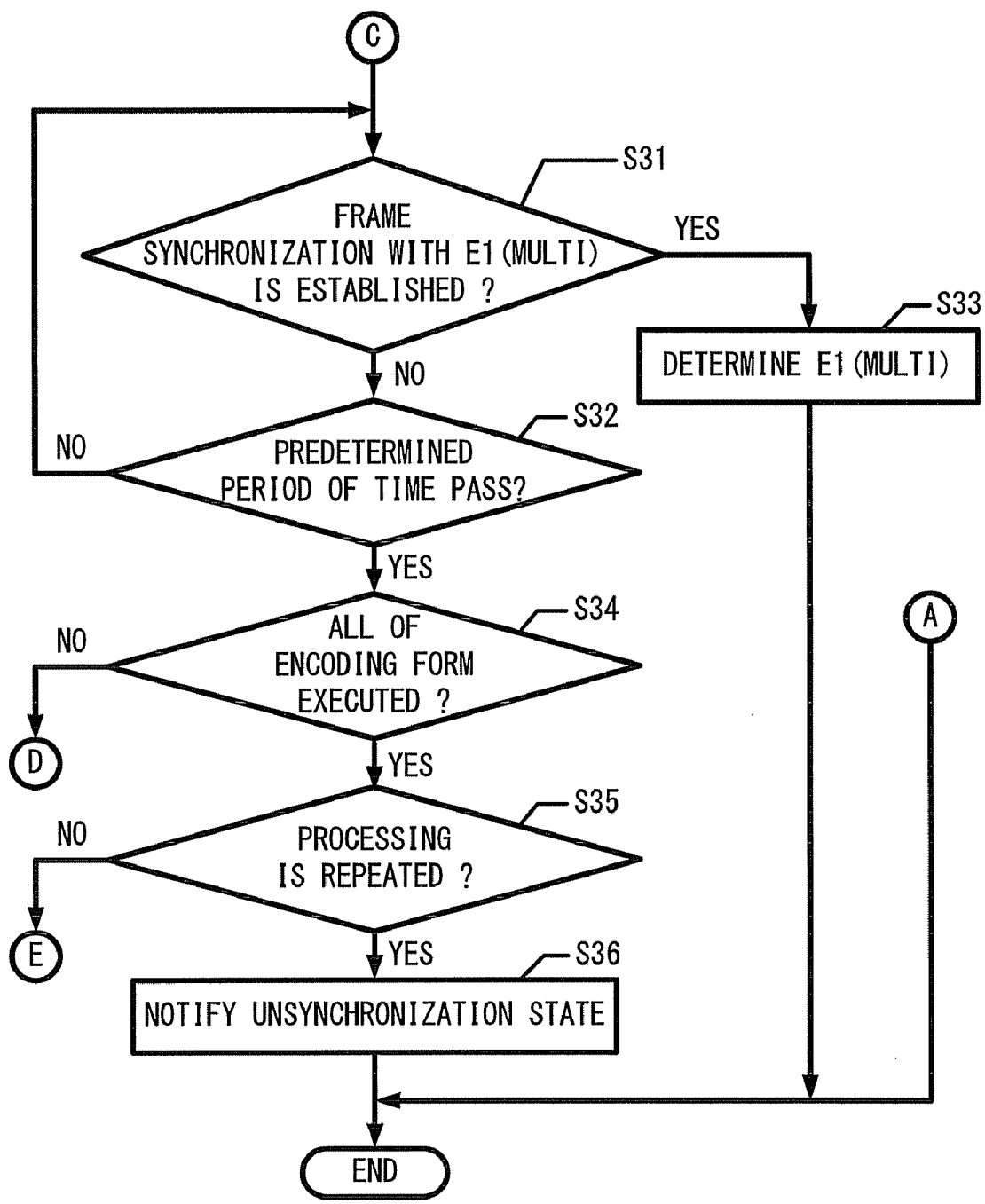
FIG. 9 is a flowchart illustrating steps of the clock signal determination processing.

FIGS. 7 to 9 are flowchart illustrating a routine of the clock signal determination processing.

The clock interface unit 100 of this embodiment after started when the communication apparatus 10 connects to the SONET/SDH line determines the encoding form and frame form of a received frame and sets the encoding form and frame form for clock signals. The clock signal determination processing is started in response to the reception of a frame after the start by the communication apparatus 10. Then, the encoding form and frame form of the received frame are determined.

Step S11: The frequency extracting section 121A extracts the frequency from a receive signal.

Step S12: The determining section 133 attempts the detection of a clock signal at 64 kHz from the frequency extracted in step S11. If a clock signal at 64 kHz is detected, the processing moves to step S14. If a clock signal at 64 kHz is not detected on the other hand, the processing moves to step S13.

Step S13: The decoding section 131 decodes the clock signals in one of predetermined three encoding forms and inputs the decoded signal to the receive frame converting section 132.

In step S13, the decoding section 131 first decodes in AMI. The second decoding in the repetition in step S34 (refer to FIG. 9), which will be described later, decodes in B8ZS. The third decoding in the further repetition in step S34 decodes in HDB3. The thus decoded signal is input to the receive frame converting section 132. The sequence of the attempt of the establishment of the synchronization with the three encoding forms is not limited thereto but can be defined freely.

Step S14: The determining section 133 determines that the clock signal is at 64 kHz under the NTT standard. After that, the processing ends.

Step S15: The determining section 133 attempts the establishment of the frame synchronization of the decoded signal, which is input from the receive frame converting section 132 in step S13, with DS1 (SF). Next, whether the synchronization is established by the attempt or not is determined. If the synchronization is established, the processing moves to step S17. If the synchronization is not established on the other hand, the processing moves to step S16.

Step S16: The determining section 133 repeats the processing in step S15 until a predetermined period of time passes. After a lapse of the predetermined period of time, the processing moves to step S21 (refer to FIG. 8).

The predetermined period of time is twice as long as the worst synchronization recovery time as described above in this embodiment but may be set as required, without limiting thereto.

Step S17: The determining section 133 determines that the frame form and encoding form of the clock signals are DS1 (SF) and the encoding form decoded in step S13, respectively. After that, the processing ends.

Step S21: The determining section 133 attempts the establishment of the frame synchronization of the decoded signal, which is input to the receive frame converting section 132 in step S13, with DS1 (ESF). Next, whether the attempts results in the establishment of the synchronization or not is determined. If the synchronization is established, the processing moves to step S23. On the other hand, if the synchronization is not established, the processing moves to step S22.

Step S22: The determining section 133 repeats the processing in step S21 until a predetermined period of time passes. After a lapse of the predetermined period of time, the processing moves to step S24.

Step S23: The determining section 133 determines that the frame form and encoding form of the clock signals are DS1 (ESF) and the encoding form decoded in step S13. After that, processing ends.

Step S24: The determining section 133 attempts the establishment of the frame synchronization of the decoded signal, which is input to the receive frame converting section 132 in step S13, with E1 (Single). Next, whether the synchronization is established by the attempt or not is determined. If the synchronization is established, the processing moves to step S26. If the synchronization is not established on the other hand, the processing moves to step S25.

Step S25: The determining section 133 repeats the processing in step S24 until a predetermined period of time passes. After a lapse of the predetermined period of time, the processing moves to step S31 (refer to FIG. 9).

Step S26: The determining section 133 determines that the frame form and encoding form of the clock signals are E1 (Single) and the encoding form decoded in step S13, respectively. After that, the processing ends.

Step S31: The determining section 133 attempts the establishment of the frame synchronization of the decoded signal, which is input to the receive frame converting section 132 in step S13, with E1 (Multi). Next, whether the attempt results in the establishment of the synchronization or not is determined. If the synchronization is established, the processing moves to step S33. On the other hand, if the synchronization is not established, the processing moves to step S32.

Step S32: The determining section 133 repeats the processing in step S31 until a predetermined period of time passes. After a lapse of the predetermined period of time, the processing moves to step S34.

Step S33: The determining section 133 determines that the frame form and encoding form of the clock signals are E1 (Multi) and the encoding form decoded in step S13. After that, processing ends.

Step S34: The determining section 133 determines whether the attempt in the establishment of the synchronization with all of the encoding forms (AMI, B8ZS and HDB3) has been executed or not. If so, the processing moves to step S35. If not on the other hand, the processing moves to step S13 (refer to FIG. 7).

Step S35: The determining section 133 determines whether a predetermined number of times (such as three times) of the processing up to step S34 have been repeated or not. If so, the processing moves to step S36. If not on the other hand, the processing moves to step S11 (refer to FIG. 7).

Step S36: The determining section 133 notifies the unsynchronization state that the establishment of the synchronization fails. Thus, a user or other communicating apparatus can be notified of that the establishment of the synchronization on the signal received by the communication apparatus 10 has failed. After that, the processing ends.

Thus, the communication apparatus 10 notifies that it is in the unsynchronization state and awaits under the condition that clock signals are not set.

If the encoding form and frame form of the clock signals are determined by the establishment of the synchronization of the clock signals, the processing ends. Then, the clock interface unit 100 is set with the encoding form and frame form of the synchronized clock signals, and the communication apparatus 10 operates.

Notably, though the clock signal determining processing of this embodiment attempts the establishment of the synchronization for combinations of all encoding forms and frame forms (such as 13 combinations=1 combination at a frequency of 64 kHz+3 encoding forms×2 standards×2 forms within the standards), the establishment of the synchronization on AMI and B8ZS with DS1 only (DS1 (SF/ESF)) and on HDB3 with E1 only (E1 (Single/Multi)) may be attempted, without limited thereto.

Next, improper setting detection processing will be described that detects a fault in the setting of clock signals in a case where clock signals are preset in the clock interface unit 100 of this embodiment.

FIGS. 10 to 14 are flowcharts illustrating routines of the improper setting detection processing.

The encoding form and frame form of frames to be exchanged by the communication apparatus 10 can be preset in the clock interface unit 100 of this embodiment. The improper setting detection processing is processing that detects in a case where the encoding form and frame form of frames are preset in that way but the setting or settings are improper. The improper setting detection processing is processing to be performed in the clock interface unit 100 if synchronization is not established with the preset encoding form and frame form of frames.

Step S41: The control section 134 obtains the preset encoding form and frame form of frames. The setting details may be identified on the basis of the firmware written in the DSP 150F by the boot loader section 150D, for example.

Step S42: The frequency extracting section 121A extracts the clock component from a receive signal.

Step S43: The control section 134 determines whether the preset encoding form and frame form of clock signal, which are obtained in step S41 are 64 kHz or not. If the setting of clock signals is 64 kHz, the processing moves to step S51. If not on the other hand, the processing moves to step S44.

Step S44: The determining section 133 attempts the detection of a clock signal of sin waves at a frequency of 64 kHz, which is a clock signal of the NTT standard, from the clock component extracted in step S42. If a clock signal of sin waves at 64 kHz is detected, the processing moves to step S87 (refer to FIG. 14). If not, the processing moves to step S51 (refer to FIG. 11).

Step S51: The decoding section 131 decodes the signal with one encoding form of the predetermined three encoding forms and inputs the decoded signal to the receive frame converting section 132.

In step S51, like step S13 of the clock signal determination processing (refer to FIG. 7), the decoding section 131 performs decoding with AMI if decoding is required first. The decoding section 131 performs decoding with B8ZS if the second decoding is required in the repetition in step S84 (refer to FIG. 14), which will be described later. The decoding section 131 performs decoding with HDB3 if the third decoding is required in further repetition in step S84. The thus decoded signal is input to the receive frame converting section 132. Without limiting thereto, the sequence of the attempt of the establishment of the synchronization with the three encoding form can be set freely.

Step S52: If the set standard is DS1 (SF), the determining section 133 determines whether the encoding form of the signal input in step S51 is the same encoding form as the set one or not. If the set standard is DS1 (SF) and the encoding form of the input signal is the same encoding form as the set one, the processing moves to step S61 (refer to FIG. 12). If at least one of the conditions is satisfied that the set standard is not DS1 (SF) and that the encoding form of the input signal is not the same encoding form as the set one, the processing moves to the processing in step S53.

This can eliminate the waste of the attempt of the establishment of the synchronization in the exactly same encoding form and frame form as the set ones and can save the time and routines because the fact that the existing setting is improper in the situation where the improper setting detection processing is performed.

Without limiting thereto, the establishment of the synchronization in the encoding form and frame form, which are set here, may be attempted. In this case, if the attempt results in the establishment of the synchronization, the communication apparatus 10 may notify a user or other communication apparatus of that it can operate normally or that it can operate in accordance with the setting.

Step S53: The determining section 133 attempts the establishment of the frame synchronization of the decoded signal, which is input from the receive frame converting section 132 in step S51, with DS1 (SF). Next, whether the synchronization is established by the attempt or not is determined. If the synchronization is established, the processing moves to step S87 (refer to FIG. 14). If the synchronization is not established on the other hand, the processing moves to step S54.

Step S54: The determining section 133 repeats the processing in step S53 until a predetermined period of time passes.

Figure 12:
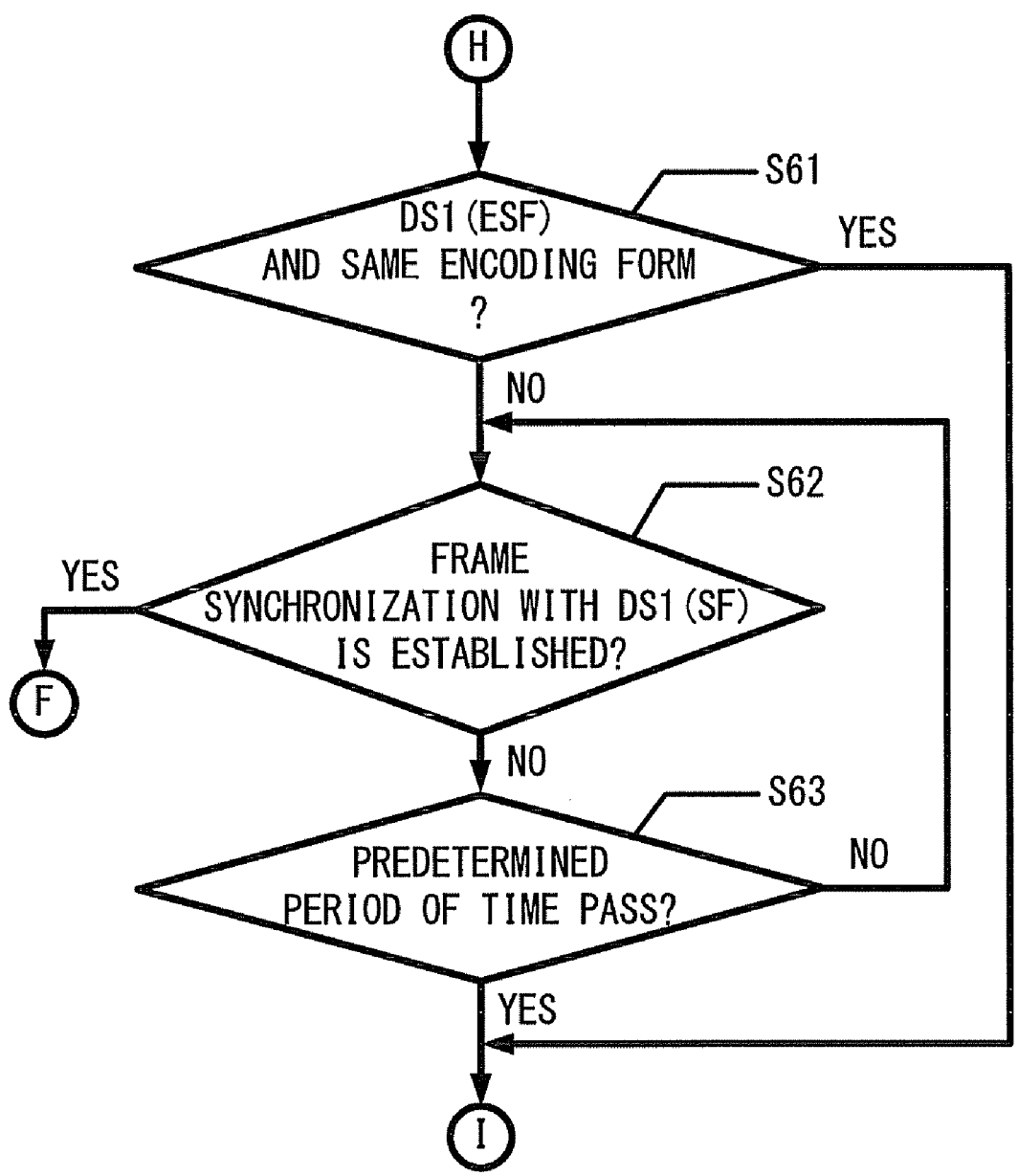
FIG. 12 is a flowchart illustrating steps of the improper setting detection processing.
Figure 13:
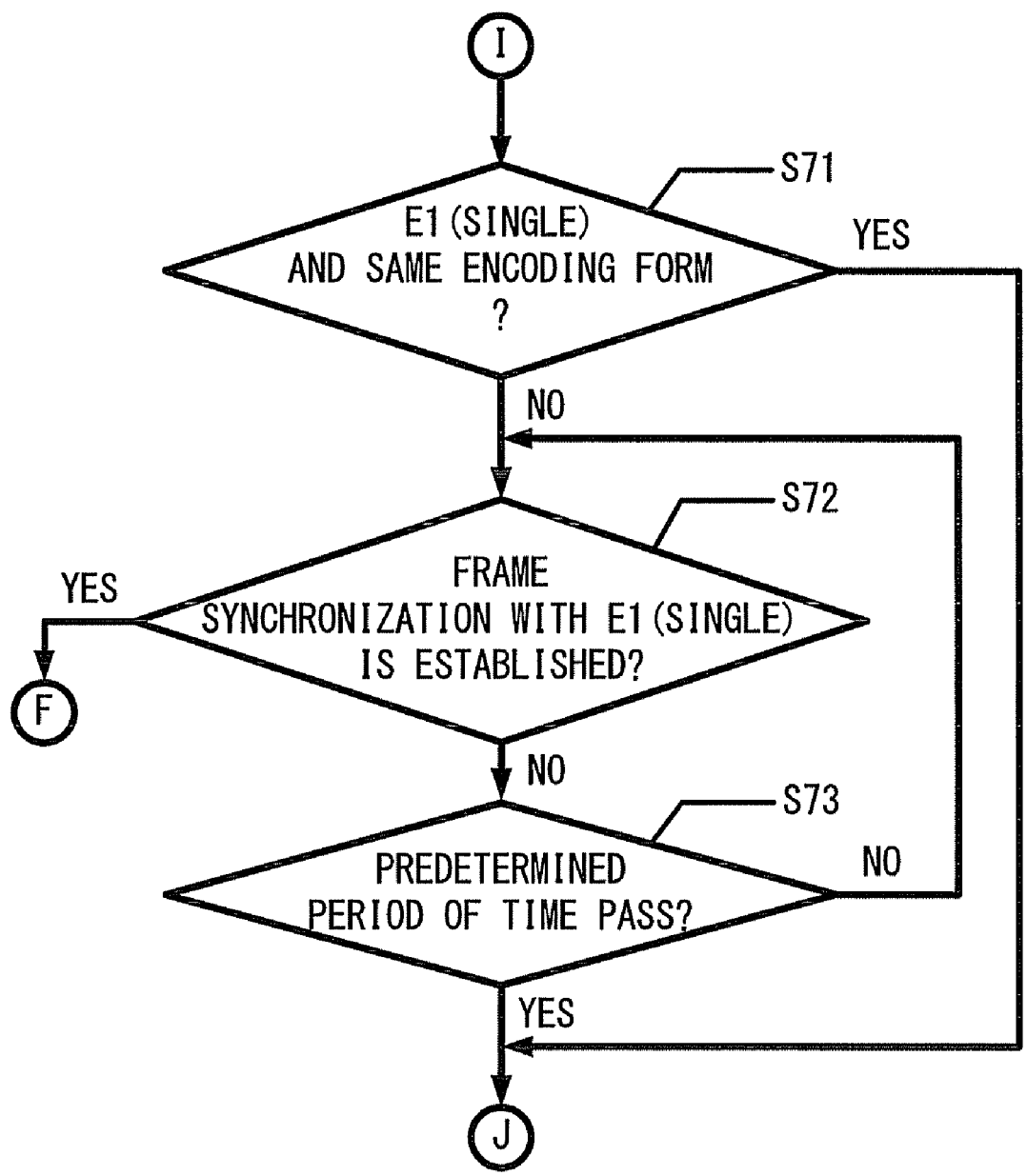
FIG. 13 is a flowchart illustrating steps of the improper setting detection processing.
Figure 14:
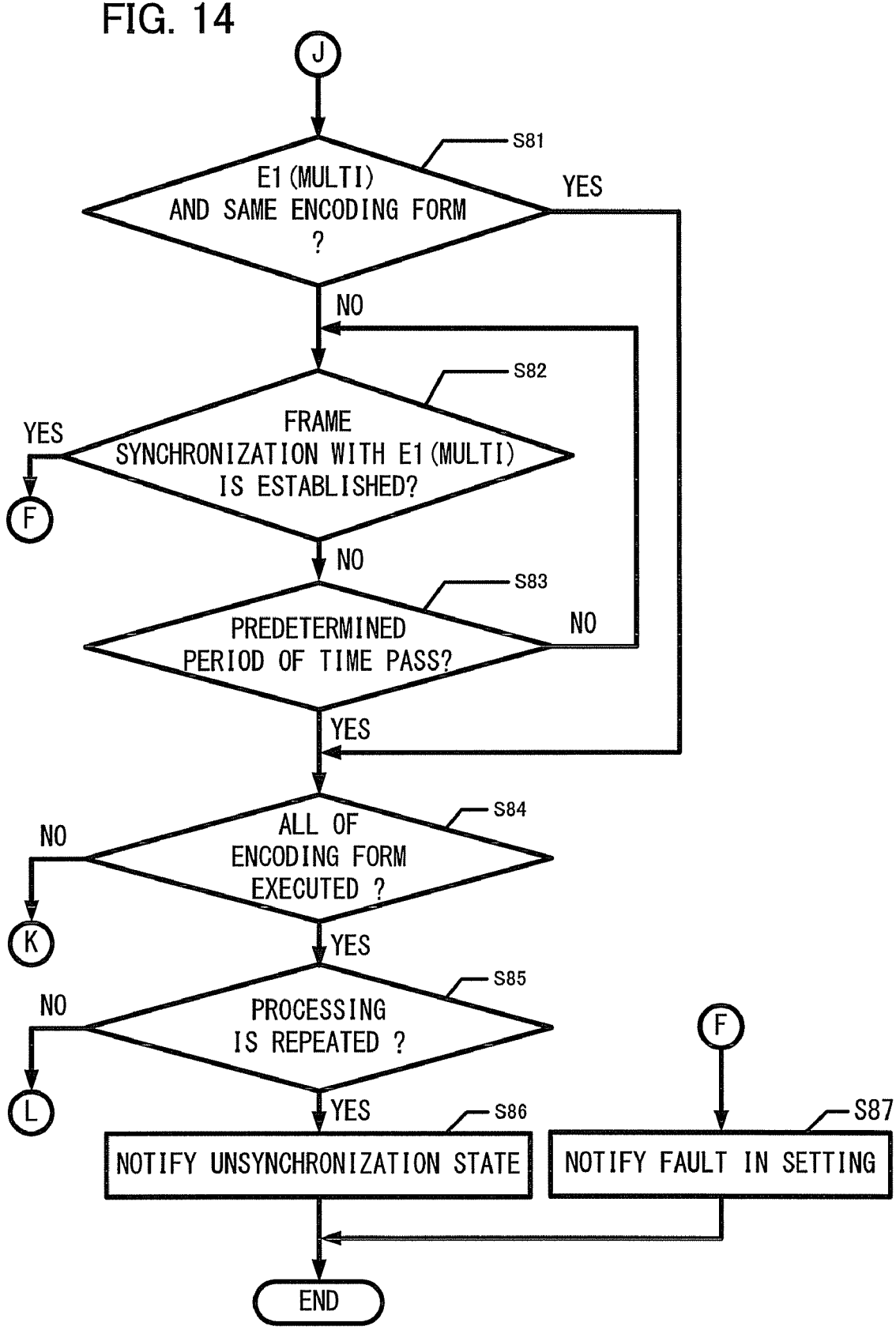
FIG. 14 is a flowchart illustrating steps of the improper setting detection processing.

After a lapse of the predetermined period of time, the processing moves to step S61 (refer to FIG. 12).

The predetermined period of time is twice as long as the worst synchronization recovery time as described above in this embodiment but may be set as required, without limiting thereto.

Step S61: If the set standard is DS1 (ESF), the determining section 133 determines whether the encoding form of the signal input in step S51 is the same encoding form as the set one or not. If the set standard is DS1 (ESF) and the encoding form of the input signal is the same encoding form as the set one, the processing moves to step S71 (refer to FIG. 13). If at least one of the conditions is satisfied that the set standard is not DS1 (ESF) and that the encoding form of the input signal is not the same encoding form as the set one, the processing moves to the processing in step S62.

Step S62: The determining section 133 attempts the establishment of the frame synchronization of the decoded signal, which is input from the receive frame converting section 132 in step S51, with DS1 (ESF). Next, whether the synchronization is established by the attempt or not is determined. If the synchronization is established, the processing moves to step S87 (refer to FIG. 14). If the synchronization is not established on the other hand, the processing moves to step S63.

Step S63: The determining section 133 repeats the processing in step S62 until a predetermined period of time passes. After a lapse of the predetermined period of time, the processing moves to step S71 (refer to FIG. 13).

Step S71: If the set standard is E1 (Single), the determining section 133 determines whether the encoding form of the signal input in step S51 is the same encoding form as the set one or not. If the set standard is E1 (Single) and the encoding form of the input signal is the same encoding form as the set one, the processing moves to step S81 (refer to FIG. 14). If at least one of the conditions is satisfied that the set standard is not E1 (Single) and that the encoding form of the input signal is not the same encoding form as the set one, the processing moves to the processing in step S72.

Step S72: The determining section 133 attempts the establishment of the frame synchronization of the decoded signal, which is input from the receive frame converting section 132 in step S51, with E1 (Single). Next, whether the synchronization is established by the attempt or not is determined. If the synchronization is established, the processing moves to step S87 (refer to FIG. 14). If the synchronization is not established on the other hand, the processing moves to step S73.

Step S73: The determining section 133 repeats the processing in step S72 until a predetermined period of time passes. After a lapse of the predetermined period of time, the processing moves to step S81 (refer to FIG. 14).

Step S81: If the set standard is E1 (Multi), the determining section 133 determines whether the encoding form of the signal input in step S51 is the same encoding form as the set one or not. If the set standard is E1 (Multi) and the encoding form of the input signal is the same encoding form as the set one, the processing moves to step S84. If at least one of the conditions is satisfied that the set standard is not E1 (Multi) and that the encoding form of the input signal is not the same encoding form as the set one, the processing moves to the processing in step S82.

Step S82: The determining section 133 attempts the establishment of the frame synchronization of the decoded signal, which is input from the receive frame converting section 132 in step S51, with E1 (Multi). Next, whether the synchronization is established by the attempt or not is determined. If the synchronization is established, the processing moves to step S87. If the synchronization is not established on the other hand, the processing moves to step S83.

Step S83: The determining section 133 repeats the processing in step S82 until a predetermined period of time passes. After a lapse of the predetermined period of time, the processing moves to step S84.

Step S84: The determining section 133 determines whether the attempt in the establishment of the synchronization with all of the encoding forms (AMI, B8ZS and HDB3) has been executed or not. If so, the processing moves to step S85. If not on the other hand, the processing moves to step S51 (refer to FIG. 11).

Step S85: The determining section 133 determines whether a predetermined number of times (such as three times) of the processing up to step S84 have been repeated or not. If so, the processing moves to step S86. If not on the other hand, the processing moves to step S42 (refer to FIG. 10).

Step S86: The determining section 133 notifies the unsynchronization state that the establishment of the synchronization fails. Thus, a user or other communication apparatus can be notified of that the establishment of the synchronization on the signal received by the communication apparatus 10 has failed. After that, the processing ends.

Step S87: The determining section 133 notifies the fault in the existing setting. Thus, a user or other communication apparatus can learn the fact that the setting preset in the communication apparatus 10 has a fault. At that time, the determining section 133 notifies the frame form and encoding form of other clock signals on which the synchronization is established. Thus, a user or other communication apparatus can learn the fact that the synchronization of the signal received by the communication apparatus 10 can be established with the encoding form and frame form of clock signals excluding the preset ones. After that the processing ends.

Next, an example of the specific hardware configuration of the communication apparatus 10 of this embodiment will be described.

Figure 15:
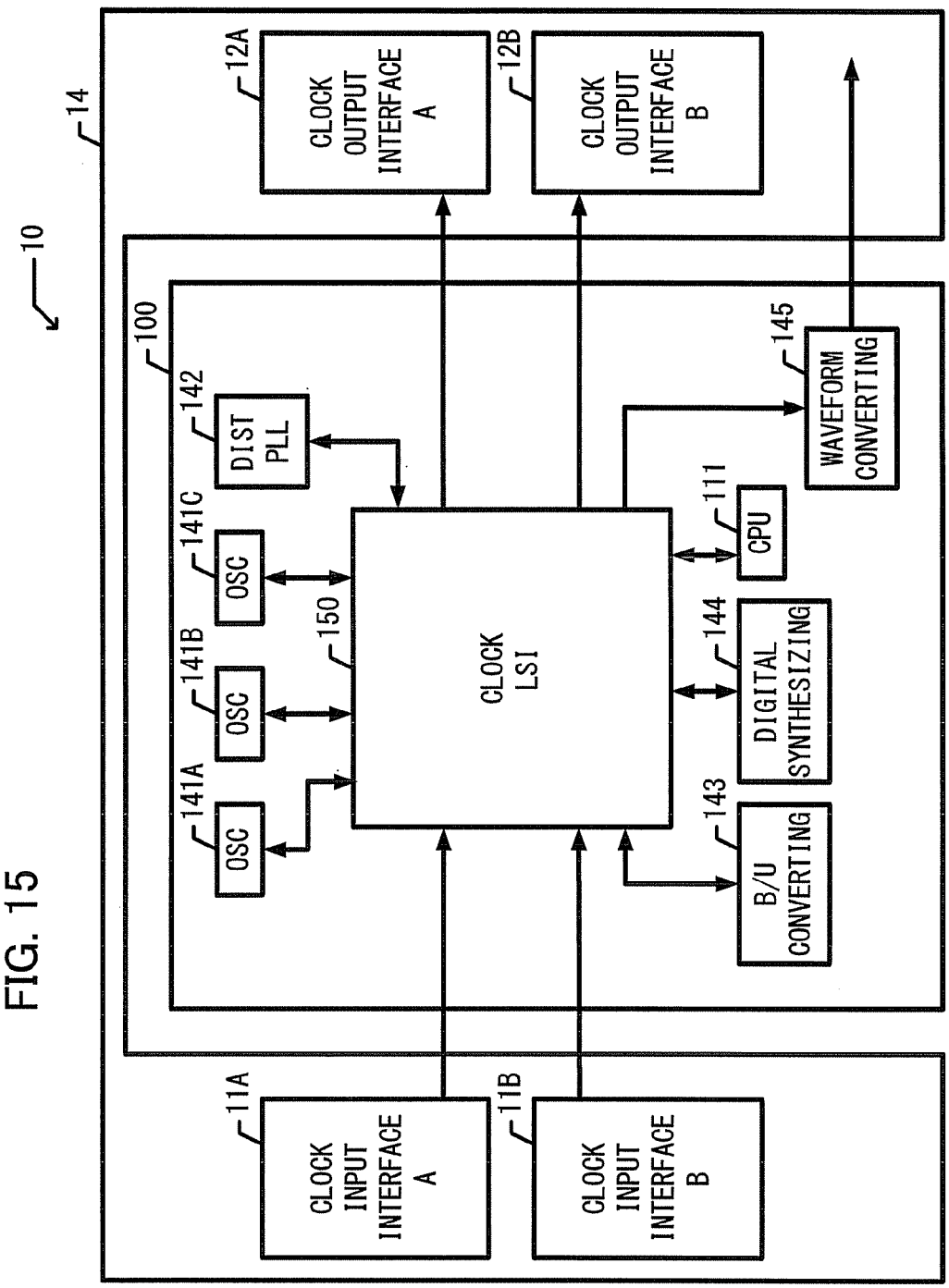
FIG. 15 is a diagram illustrating a hardware configuration of a communication apparatus.

FIG. 15 is a diagram illustrating a hardware configuration of the communication apparatus.

The communication apparatus 10 of this embodiment determines the encoding form and frame form of clock signals and automatically sets the encoding form and frame form of clock signals on the basis of the determination result, in the hardware configuration below.

As illustrated in FIG. 15, the communication apparatus 10 of this embodiment includes the clock interface unit 100 and an external-line connector unit 14.

The external-line connector unit 14 includes a clock input interface unit A11A, a clock input interface unit B11B, an output interface unit A12A and a clock output interface unit B12B. The external-line connector unit 14 further includes a terminal and a resistance attenuator, not shown.

The clock interface unit 100 includes oscillating units 141A, 141B and 141C, a DIST (or Distortion) PLL 142, a B/U converting unit 143, a digital synthesizing unit (or DDS: Direct Digital Synthesizer) 144 and a waveform converting unit 145 in addition to the CPU 111 and the clock LSI 150.

The clock input interface unit A11A and clock input interface unit B11B are interfaces that connect the communication apparatus 10 and the clock interface unit 100 in order to input a receive signal received by the communication apparatus 10 to the clock interface unit 100.

The oscillating units 141A, 141B, 141C include a VCXO (Voltage Controlled Xtal Oscillator), not illustrated, and an LPF (Low-pass filter), not illustrated, and supplies frequencies in a predetermined range to the clock LSI 150, the details of which will be described later with reference to FIG. 17.

The DIST PLL 142 reduces the distortion of the clock signal output from the clock interface unit 100 to the communication apparatus 10.

The B/U converting unit 143 can convert between a bipolar signal and a unipolar signal.

The digital synthesizing unit 144 can generate an oscillation waveform to be output through the synthesis with digital data.

The waveform converting unit 145 can convert a TTL (Transistor-Transistor Logic) signal to a sin wave.

In this case, clock signals of different channels are input to the clock input interface unit A11A and the clock input interface unit B11B. For example, a 0-channel clock signal is input to the clock input interface unit A11A. A 1-channel clock signal is input to the clock input interface unit B11B.

In the same manner, the clock output interface unit A12A and clock output interface unit B12B output clock signals of different channels. For example, the clock output interface unit A12A outputs a 0-channel clock signal. The clock output interface unit B12B outputs a 1-channel clock signal.

Next, the connection among the clock LSI 150, the clock input interface unit A11A and clock output interface unit A12A will be described in a case where the communication apparatus 10 and the clock interface are in operation with the clock signals indicated by the determination of the encoding form and frame form of the clock signal input to the communication apparatus 10.

Figure 16:
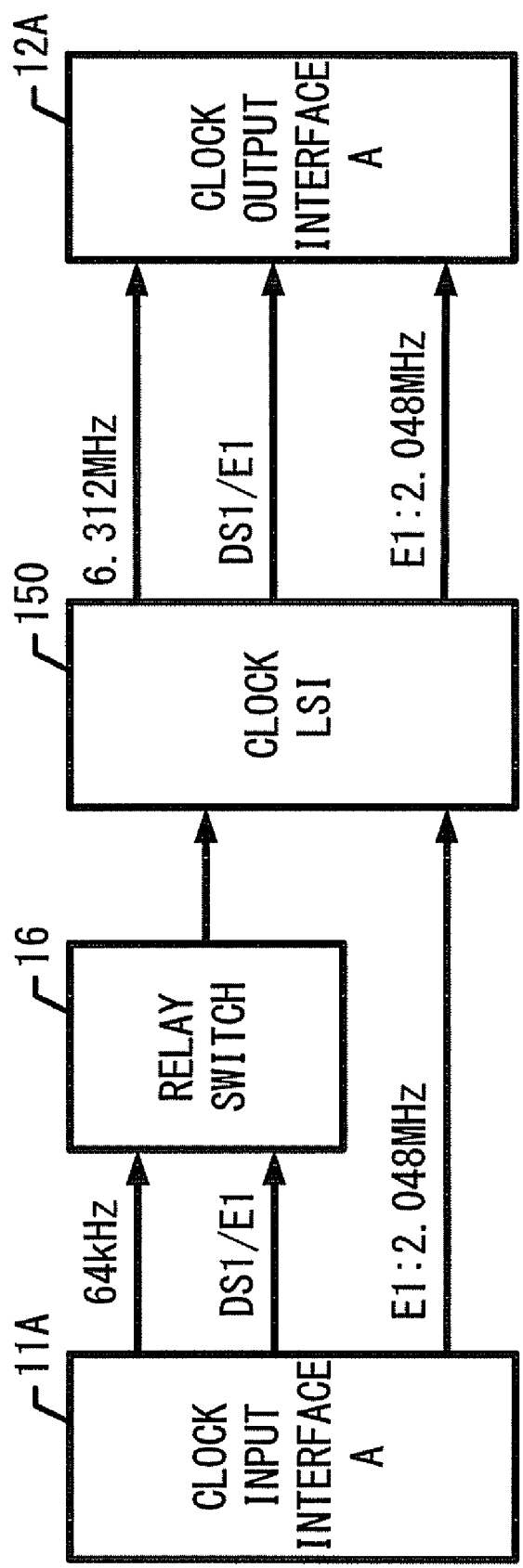
FIG. 16 is a diagram illustrating connections among a clock input interface unit, a clock output interface unit and a clock LSI.

FIG. 16 is a diagram illustrating the connection among the clock input interface unit, the clock output interface unit and the clock LSI. Illustrating the clock input interface unit A11A and the clock output interface unit A12A in FIG. 16, the same is true for the clock input interface unit B11B and the clock output interface unit B12B.

The clock LSI 150 receives the input of a clock signal from the clock input interface unit A11A and outputs a clock signal to the clock output interface unit A12A on the basis of the input clock signal.

Between the clock input interface unit A11A and the clock LSI 150, the circuit that transmits signals of the NTT standards of 64 kHz, DS1 and E1 includes a transformer, not illustrated, and a relay switch 16. One of the signals of the NTT standards of 64 kHz and DS1 and E1 can be transmitted by switching the circuits through the relay switch 16. On the other hand, the commonality of the circuits has been achieved for DS1 and E1, and the switching is not required therebetween.

In this case, the commonality of connectors (not illustrated) is achieved for DS1 (1.544 Mbps) and E1 (2.048 Mbps) between the clock input interface unit A11A and the clock LSI 150. On the other hand, one separate connector (not illustrated) is provided which is to connect to a circuit that transmits signals of 64 kHz, 8 kHz and 400 Hz of NTT standards. Another separate connector (not illustrated) is provided which is to be connected to a circuit that transmits a signal input at 2.048 MHz of ETSI standard.

Between the clock output interface unit A12A and clock LSI 150, separate circuits are provided which transmit a signal of 6.312 MHz of the NTT standard, a signal of DS1/E1 and a signal output at 2.048 MHz of ETSI standard, respectively.

Between the clock output interface unit A12A and the clock LSI 150, the commonality of connectors (not illustrated) is achieved for DS1 (1.544 Mbps) and E1 (2.048 Mbps). On the other hand, a circuit that transmits a signal of 6.312 MHz of the NTT standard is provided as a separate connector (not illustrated). A circuit that transmits a signal output at 2.048 MHz of ETSI standard is provided as another separate connector (not illustrated).

Because the 64 kHz input signal and 6.312 MHz output signal of the NTT standard and 2.048 MHz input/output signals of ETSI standard are pure clock signals, which are not in a frame form, separate circuits and connectors are provided for the signals. Because the 64 kHz input signal, 6.312 MHz output signal and 2.048 MHz input/output signals are pure clock signals, the signals are handled as clock signals within the clock LSI 150.

The commonality of the circuits implements the commonality of the terminal and resistance attenuator of the external-line connector unit 14 (refer to FIG. 15) regarding the circuits.

Next, the configuration of the clock LSI 150 will be described.

Figure 17:
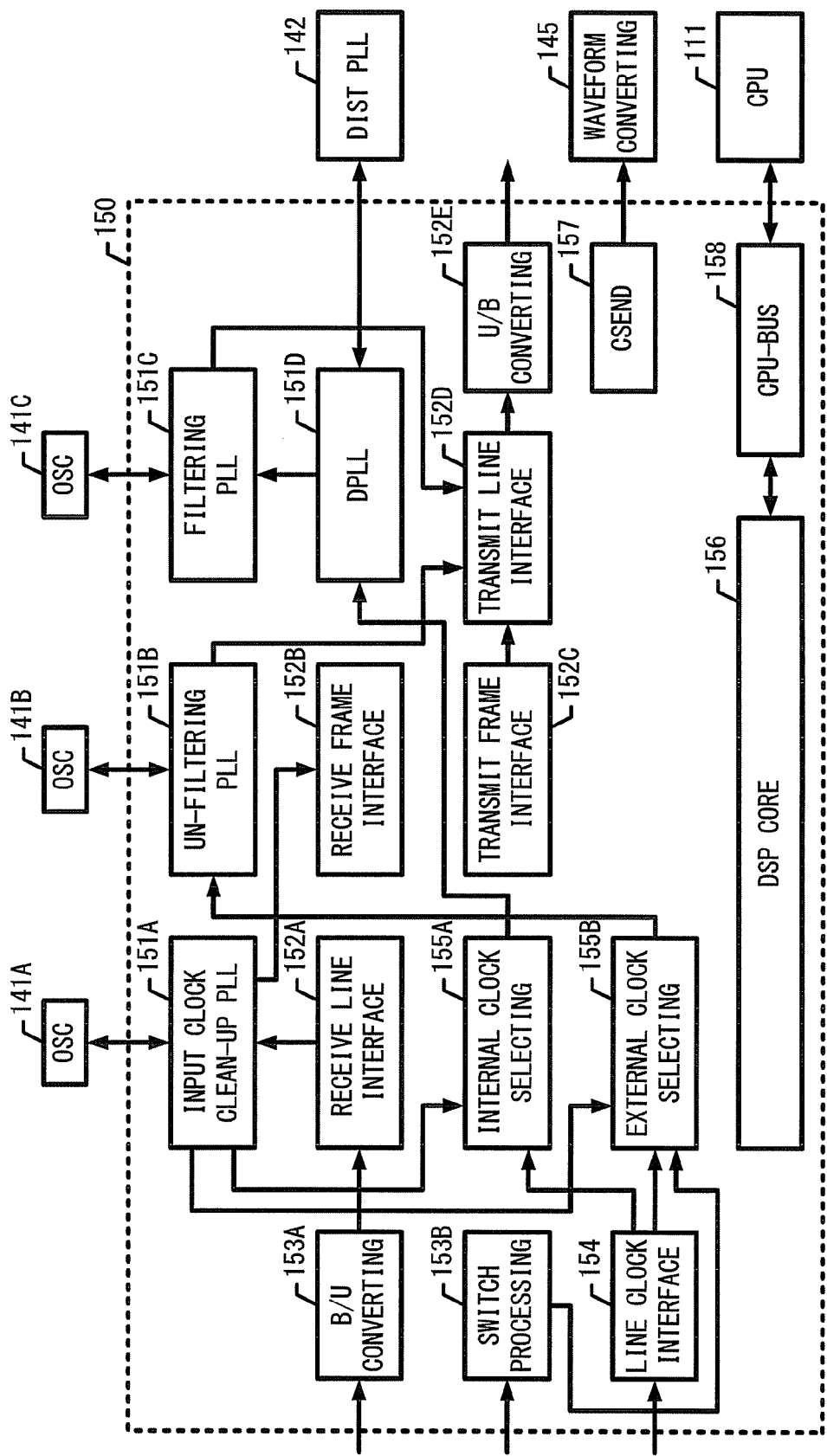
FIG. 17 is a diagram illustrating a configuration of the clock LSI.

FIG. 17 is a diagram illustrating the configuration of the clock LSI.

The clock LSI 150 includes an input clock clean-up PLL 151A, a un-filtering PLL 151B, a filtering PLL 151C, a DPLL (Digital Phase Locked Loop) 151D, a receive line interface unit 152A, a receive frame interface unit 152B, a transmit frame interface unit 152C, a transmit line interface unit 152D, a U/B converting unit 152E, a B/U converting unit 153A, a switching processing unit 153B, a line clock interface unit 154, an internal clock selecting unit 155A, an external clock selecting unit 155B, a DSP core 156, a CSEND unit 157 and a CPU-BUS unit 158.

The input clock clean-up PLL 151A is a PLL that connects to the oscillating unit 141A and reduces the noise of an input clock signal. The input clock clean-up PLL 151A includes a programmable fractional divider having a Divide function, which is adaptable to the frequencies provided by the standards supported by the communication apparatus 10.

The un-filtering PLL 151B is a PLL that connects to the oscillating unit 141B and is phase-locked without filtering. The un-filtering PLL 151B also has a Divide function, which is adaptable to the frequencies provided by the standards supported by the communication apparatus 10.

The filtering PLL 151C is a PLL that connects to the oscillating unit 141C and is phase-locked with filtering. The filtering PLL 151C also includes a programmable fractional divider having a Divide function, which is adaptable to the frequencies provided by the standards supported by the communication apparatus 10.

The DPLL 151D is a PLL including a digital circuit. The DPLL 151D connects to the DIST PLL 142 and is phase-locked by a clock signal with the distortion reduced by the DIST PLL 142. The DPLL 151D also includes a programmable fractional divider having a Divide function, which is adaptable to the frequencies provided by the standards supported by the communication apparatus 10.

The receive line interface unit 152A receives and performs signal conversion on the line input, which is received by the communication apparatus 10 and is input to the clock interface unit 100.

The receive frame interface unit 152B creates a frame on the basis of a signal output from the receive line interface unit 152A.

The transmit frame interface unit 152C creates a frame representing a signal to be transmitted.

The transmit line interface unit 152D creates a line output on the basis of the frame created by the transmit frame interface unit 152C.

The U/B converting unit 152E performs U/B conversion, which converts a unipolar signal to a bipolar signal, on the line output from the transmit line interface unit 152D.

The B/U converting unit 153A performs B/U conversion, which converts a bipolar signal to a unipolar signal, on the line input to be input to the receive line interface unit 152A.

The switching processing unit 153B controls the relay switch 16 (refer to FIG. 16) and internal clock selecting unit 155A, for example, to perform processing of switching between 64-kHz signals and DS1/E1 signals.

The line clock interface unit 154 receives the input of the line clock output from other apparatus. The line clock is a clock signal to be used as a spare in a case where normally used clock is not available due to a failure, for example.

The internal clock selecting unit 155A selects a clock signal to be used for synchronization within the communication apparatus 10 from clock signals input to the internal clock selecting unit 155A.

The external clock selecting unit 155B selects a clock signal to be supplied to the outside of the communication apparatus 10 for the synchronization outside of the communication apparatus 10 from clock signals input to the external clock selecting unit 155B.

The DSP core 156 controls the components within the clock LSI 150 in accordance with the firmware loaded from the flash memory 112 (refer to FIG. 6). The DSP core 156 controls the DPLL 151D and other synchronization processing under standards. The control includes the optimization of the receive line interface unit 152A, receive frame interface unit 152B, transmit frame interface unit 152C, transmit line interface unit 152D, line clock interface unit 154 and the dividing ratios of the PLLs in accordance with the usage and design of the clock interface unit 100.

The DSP core 156 further controls the switching between 64-kHz clock signals and DS1/E1 clock signals and performs Divide control in the PLLs (including the input clock clean-up PLL 151A, un-filtering PLL 151B and filtering PLL 151C).

The switching function of the DSP core 156 may mainly include switching of the encoding form for decoding in the receive line interface unit 152A (refer to the decoding section 131 in FIG. 4), switching of the encoding form for encoding in the transmit line interface unit 152D (refer to the encoding section 137 in FIG. 4), switching of the encoding form and frame form of a frame in the receive frame interface unit 152B (refer to the receive frame converting section 132 in FIG. 4), switching of the encoding form and frame form in the transmit frame interface unit 152C (refer to the transmit frame converting section 136 in FIG. 4), switching of the clock signals in clean-up by the input clock clean-up PLL 151A on the clock signal input to the clock LSI 150 and switching of the frequencies of the clock signal to be output from the clock LSI 150.

The CSEND unit 157 outputs a clock signal of 6.312 MHz of the NTT standard to the waveform converting unit 145. In this case, the signal from the CSEND unit 157 is output by a TTL signal. The waveform converting unit 145 converts the waveform of the input clock signal of 6.312 MHz from a TTL signal to a sin wave to output.

The CPU-BUS unit 158 connects the DSP core 156 and the CPU 111. Between the DSP core 156 and the PCU 111, data is transmitted through the CPU-BUS unit 158.

In the clock LSI 150, a clock signal is obtained by synchronizing the internal clock signal generated by the DPLL 151D. With reference to the thus obtained signal, the DSP 150F may be caused to control the programmable fractional divider of the filtering PLL 151c to cause the programmable fractional divider to generate a clock signals at 1.544 MHz of DS1, 2.048 MHz of E1 or 6.312 MHz of the NTT standard. This is synchronized with 38.88 MHz or 77.76 MHz, which is the frequency of the internal clock.

An unfiltered signal output on the basis of the un-filtering PLL 151B is generated from 8 KHz, which is the reference of the internal clocks.

In this way, in this embodiment, the commonality of the decoding section 131, receive frame converting section 132, transmit frame converting section 136 and encoding section 137 of the clock interface unit 100 (refer to FIG. 4) can be achieved for 64 kHz signals of the NTT standard and DS1 signals and E1 signals.

The configuration as described above allows the configuration of an apparatus with a clock interface in different specifications.

Though this embodiment is applicable to the input of 64 KHz and the output of 6.312 MHz of the NTT standard and the input/output of 2.048 MHz of ETSI standard, the applicability is not required to the input of 64 KHz, the output of 6.312 MHz and the input/output of 2.048 MHz, without limiting thereto. In this case, the complete commonality can be achieved only for DS1 and E1.

One circuit may be switched for use as a circuit to which the input/output clock signals of E1 under ETSI standard are transmitted and a circuit to which the input/output clock signals of 2.048 MHz are transmitted. Thus, the commonality of the separately provided circuit (and connector) of 2.048 MHz as described above in this embodiment can be achieved.

In this embodiment, after the communication apparatus 10 is started in connection with the SONET/SDH line, the encoding form and frame form of a received frame are determined, and the encoding form and frame form of the clock signal are set. This can eliminate the necessity for hardware development for each specification, and clock signals under multiple standards can be supported by one hardware configuration.

The commonality of the hardware of the clock interface unit 100 allows the hardware of the one same communication apparatus 10 to support multiple standards, encoding forms and frame forms of clock signals with different specifications. In other words, in the clock interface unit 100, the firmware that controls the synchronization processing according to the specifications of corresponding one of the NTT (64 kHz), North America (DS1) and ETSI (E1) standards may be loaded in accordance with the clock signal of the connected communication. Thus, the different specifications can be supported by one hardware configuration.

Because the encoding form and frame form of the clock signal of a receive signal are determined on the basis of the encoding form and frame form of the clock signal detected by the clock interface unit 100, and the clock signal is set on the basis of the determination result. Therefore, because the setting can be performed autonomously in accordance with the clock signal in use, the setting work by a user can be omitted.

The program data of the firmware adapted to the encoding forms and frame forms of clock signals may be stored in the flash memory 112, and, if the encoding form and frame form of a clock signal are determined, the program of the corresponding adapted firmware may be loaded from the flash memory 112 on the basis of the determination result. Then, the program of the loaded firmware may be set. Thus, the firmware suitable for the determined encoding form and frame form of the clock signal can operate. Therefore, differences among clock signals can be absorbed by the hardware, and the communication apparatus 10 and clock interface unit 100 can be implemented which can be adapted to clock signals of different encoding forms and frame forms with one same hardware configuration.

In a case where the encoding form and frame form of clock signals are preset by a user, for example, if the synchronization is not established even in accordance with the settings, a fault setting by the user can be detected in advance by attempting the establishment of the synchronization on the encoding forms and frame forms. Thus, further in a case where multiple communication apparatus 10 are provided which are connected to transmission paths under multiple different standards, the advance detection may be allowed of the case where the communication end to which the communication apparatus 10 is connected is determined improperly regardless of no improper settings and the destination is improper against the original intention of the deployment.

Having described that the clock interface unit 100 is applied to the communication apparatus 10 for SONET/SDH above, the clock interface unit 100 is widely applicable to other communication apparatus without limiting thereto.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions have been described in detail, it should be understood that the various changes, substitutions, and alterations could be made hereto without departing from the spirit and scope of the invention.

What is claimed is:

1. A communication apparatus having a clock interface unit supplying a clock signal for synchronization, the communication apparatus comprising:
    a clock extracting section configured to extract a clock component from a received signal;
    a decoding section configured to decode the clock component extracted by the clock extracting section in all of one or more predetermined encoding forms so as to generate decoded signals;
    a frame converting section configured to convert the decoded signals generated by the decoding section in all of one or more predetermined frame forms so as to create reception frames;
    a determining section configured to determine a decodable encoding form in all of the one or more predetermined encoding forms and a convertible frame form from all of the one or more predetermined frame forms based on synchronization with the reception frames created by the frame converting section;
    a setting section configured to set, into the clock signal, the decodable encoding form and the convertible frame form determined to be right by the determining section; and
    a clock signal output section configured to output the clock signal set by the setting section.

2. The communication apparatus according to claim 1,
    wherein at least either a plurality of the predetermined encoding forms or a plurality of the predetermined frame forms exists,
    the decoding section generates the decoded signal by decoding in all of the predetermined encoding forms the clock component extracted by the clock extracting section,
    the frame converting section creates reception frames by converting the decoded signal to frames in all of the predetermined encoding forms,
    the determining section determines whether a combination of the encoding form and the frame form is right or not, based on the reception frame, determines the right combination of the encoding form and frame form, based on the determination result, and
    the setting section sets the clock signal based on the combination of the encoding form and frame form determined to be right by the determining section.

3. The communication apparatus according to claim 1, further comprising:
    a notifying section configured to notify that the encoding form and the frame form are determined to be wrong, when one encoding form in the predetermined encoding forms and one frame form in the predetermined frame forms are set and the set encoding form and the frame form are determined as wrong, based on the reception frame.

4. The communication apparatus according to claim 1, further comprising:
    a setting information storage section configured to store a setting information for performing setting regarding the clock signal,
    wherein the setting section sets the clock signal by loading setting information according to the encoding form and the frame form, stored in the setting information storage section.

5. The communication apparatus according to claim 4, further comprising:
    a signal processing section configured to operate in accordance with firmware controlling the clock signal output section to generate the clock signal, based on the encoding form and the frame form determined to be right by the determining section,
    wherein the determining section attempts an establishment of synchronization with the reception frame generated by the frame converting section and determines that the encoding form and the frame form are right when the synchronization is established,
    the setting information includes program data of multiple firmware configurations operating in the signal processing section supporting the encoding forms and the frame forms,
    the setting section performs setting regarding the clock signal by writing the setting information to the signal processing section according to the encoding form and the frame form determined to be right by the determining section, and
    the clock signal output section generates the clock signal under the control of the signal processing section.

6. A clock signal setting method for setting a clock signal for synchronization, the clock signal setting method comprising:
    extracting a clock component from a received signal;
    generating decoded signals by decoding the extracted clock component in all of one or more predetermined encoding forms;
    creating reception frames in all of one or more predetermined frame forms, by converting the decoded signal;
    determining a decodable encoding form and a convertible frame form from among the one or more predetermined encoding forms, and the one or more predetermined frame forms, respectively, based on synchronization with the created reception frame;
    setting, into the clock signal, the determined decodable encoding form and the determined convertible frame form; and
    outputting the set clock signal.

7. A method for setting a clock signal, comprising:
extracting a clock component from a received signal;
decoding the extracted clock component and generating decoded signals;
creating reception frames based on the decoded signals;
determining a decodable encoding form and a convertible frame form based on synchronization with the created reception frames;
setting, into the clock signal, the determined decodable encoding form and the determined convertible frame form; and
outputting the set clock signal.

\* \* \* \* \*

UNITED STATES PATENT AND TRADEMARK OFFICE
CERTIFICATE OF CORRECTION

| | | |
|---|---|---|
| PATENT NO. | : 8,321,715 B2 | Page 1 of 1 |
| APPLICATION NO. | : 12/368715 | |
| DATED | : October 9, 2012 | |
| INVENTOR(S) | : Tatsuya Oku et al. | |

It is certified that error appears in the above-identified patent and that said Letters Patent is hereby corrected as shown below:

Column 21, Line 48, In Claim 1, delete "forms based" and insert -- forms, based --, therefor.

Signed and Sealed this
Fifth Day of March, 2013

Teresa Stanek Rea
*Acting Director of the United States Patent and Trademark Office*